(12) United States Patent
Ngo et al.

(10) Patent No.: US 11,489,695 B2
(45) Date of Patent: Nov. 1, 2022

(54) FULL-DUPLEX COMMUNICATIONS OVER A SINGLE-WIRE BUS

(71) Applicant: Qorvo US, Inc., Greensboro, NC (US)

(72) Inventors: Christopher Truong Ngo, Queen Creek, AZ (US); Alexander Wayne Hietala, Phoenix, AZ (US)

(73) Assignee: Qorvo US, Inc., Greensboro, NC (US)

( * ) Notice: Subject to any disclaimer, the term of this patent is extended or adjusted under 35 U.S.C. 154(b) by 53 days.

(21) Appl. No.: 17/102,510

(22) Filed: Nov. 24, 2020

(65) Prior Publication Data

US 2022/0166644 A1 May 26, 2022

(51) Int. Cl.
*H04L 12/40* (2006.01)
*H04L 5/14* (2006.01)
*H04L 12/18* (2006.01)
*H04L 12/403* (2006.01)

(52) U.S. Cl.
CPC .......... *H04L 12/40019* (2013.01); *H04L 5/14* (2013.01); *H04L 12/1868* (2013.01); *H04L 12/403* (2013.01); *H04L 12/40013* (2013.01)

(58) Field of Classification Search
CPC . H04L 12/40019; H04L 5/14; H04L 12/1868; H04L 12/40013; H04L 12/403
USPC ........................................................ 710/110
See application file for complete search history.

(56) References Cited

U.S. PATENT DOCUMENTS

| | | | | |
|---|---|---|---|---|
| 3,555,196 A | * | 1/1971 | Singer | H04Q 3/54525 379/333 |
| 3,953,835 A | | 4/1976 | Cuccio et al. | |
| 4,336,447 A | * | 6/1982 | Oguchi | G01F 15/063 377/19 |
| 4,424,812 A | * | 1/1984 | Lesnick | A61N 1/37252 607/30 |
| 4,497,068 A | * | 1/1985 | Fischer | H04L 25/4902 327/19 |
| 4,736,367 A | * | 4/1988 | Wroblewski | H04Q 9/14 340/459 |

(Continued)

OTHER PUBLICATIONS

Final Office Action for U.S. Appl. No. 16/736,164, dated Jan. 11, 2021, 10 pages.

(Continued)

*Primary Examiner* — Paul R. Myers
(74) *Attorney, Agent, or Firm* — Withrow & Terranova, P.L.L.C.

(57) ABSTRACT

Full-duplex communications over a single-wire bus is described in the present disclosure. In embodiments disclosed herein, a master circuit and a slave circuit(s) are able to communicate forward (master to slave) bus telegrams and reverse (slave to master) bus telegrams concurrently over a single-wire bus consisting of one wire. Specifically, the master circuit is configured to modulate the forward bus telegrams based on voltage pulse-width modulation (PWM), while the slave circuit(s) is configured to modulate the reverse bus telegrams based on current variations. In addition, the slave circuit(s) is further configured to harvest power from the master circuit concurrent to receiving the forward bus telegrams and sending the reverse bus telegrams. By supporting full-duplex communications over the single-wire bus, it is possible to improve efficiency, cost, and power consumption in an electronic device wherein the single-wire bus is deployed.

20 Claims, 11 Drawing Sheets

(56) References Cited

U.S. PATENT DOCUMENTS

| | | | |
|---|---|---|---|
| 5,412,644 A | 5/1995 | Herberle | |
| 5,459,660 A | 10/1995 | Berra | |
| 5,495,469 A * | 2/1996 | Halter | H04L 12/4135 340/3.1 |
| 5,499,247 A * | 3/1996 | Matsuda | H04L 12/417 341/94 |
| 5,586,266 A * | 12/1996 | Hershey | H04L 43/10 714/39 |
| 5,621,897 A | 4/1997 | Boury et al. | |
| 5,684,803 A | 11/1997 | Nguyen Thuy | |
| 5,734,847 A | 3/1998 | Garbus et al. | |
| 5,748,675 A * | 5/1998 | Hormel | H04L 25/0294 375/220 |
| 5,774,680 A | 6/1998 | Wanner et al. | |
| 5,787,132 A | 7/1998 | Kishigami et al. | |
| 5,832,207 A | 11/1998 | Little et al. | |
| 5,978,860 A | 11/1999 | Chan et al. | |
| 6,094,699 A | 7/2000 | Surugucchi et al. | |
| 6,141,708 A | 10/2000 | Tavallaei et al. | |
| 6,189,063 B1 | 2/2001 | Rekeita et al. | |
| 6,292,705 B1 | 9/2001 | Wang et al. | |
| 6,308,255 B1 | 10/2001 | Gorishek, IV et al. | |
| 6,310,408 B1 * | 10/2001 | Hermann | H04L 25/028 340/12.32 |
| 6,360,291 B1 | 3/2002 | Tavallaei | |
| 6,397,279 B1 | 5/2002 | Jaramillo et al. | |
| 6,408,163 B1 | 6/2002 | Fik | |
| 6,484,268 B2 | 11/2002 | Tamura et al. | |
| 6,985,990 B2 | 1/2006 | Bronson et al. | |
| 7,197,589 B1 | 3/2007 | Deneroff et al. | |
| 7,519,005 B2 | 4/2009 | Hejdeman et al. | |
| 7,685,320 B1 | 3/2010 | Wishneusky | |
| 7,729,427 B2 | 6/2010 | Kwok | |
| 8,509,318 B2 | 8/2013 | Tailliet | |
| 8,694,710 B2 | 4/2014 | Bas et al. | |
| 8,775,707 B2 | 7/2014 | Poulsen | |
| 9,166,584 B1 * | 10/2015 | Kandala | H03K 19/017509 |
| 9,252,900 B2 | 2/2016 | Poulsen | |
| 9,430,321 B2 | 8/2016 | Slik | |
| 9,519,612 B2 | 12/2016 | Hietala et al. | |
| 9,569,386 B2 | 2/2017 | Du | |
| 9,639,500 B2 | 5/2017 | Bas et al. | |
| 9,652,451 B2 | 5/2017 | Elder | |
| 9,690,725 B2 | 6/2017 | Sengoku | |
| 9,755,821 B2 | 9/2017 | Jang et al. | |
| 9,946,677 B2 | 4/2018 | Hapke | |
| 10,176,130 B2 | 1/2019 | Ngo et al. | |
| 10,185,683 B2 * | 1/2019 | Ngo | G06F 13/3625 |
| 10,558,607 B2 * | 2/2020 | Ngo | G06F 13/423 |
| 10,599,601 B1 | 3/2020 | Ngo et al. | |
| 10,983,942 B1 | 4/2021 | Ngo et al. | |
| 2001/0050713 A1 | 12/2001 | Kubo et al. | |
| 2004/0049619 A1 | 3/2004 | Lin | |
| 2004/0100400 A1 | 5/2004 | Perelman et al. | |
| 2004/0128594 A1 | 7/2004 | Elmhurst et al. | |
| 2004/0221067 A1 | 11/2004 | Huang et al. | |
| 2005/0012492 A1 | 1/2005 | Mihalka | |
| 2005/0185665 A1 | 8/2005 | Uboldi | |
| 2005/0259609 A1 | 11/2005 | Hansquine et al. | |
| 2006/0031618 A1 | 2/2006 | Hansquine et al. | |
| 2006/0050094 A1 | 3/2006 | Bury et al. | |
| 2006/0152236 A1 | 7/2006 | Kim | |
| 2006/0236008 A1 | 10/2006 | Asano et al. | |
| 2007/0073449 A1 * | 3/2007 | Kraemer | H04L 5/16 701/1 |
| 2008/0217076 A1 * | 9/2008 | Kraemer | H04L 5/1423 178/63 B |
| 2009/0121825 A1 | 5/2009 | Har | |
| 2009/0248932 A1 | 10/2009 | Taylor et al. | |
| 2010/0305723 A1 | 12/2010 | Koyama | |
| 2010/0306430 A1 | 12/2010 | Takahashi | |
| 2011/0035632 A1 | 2/2011 | Hong et al. | |
| 2011/0113171 A1 | 5/2011 | Radhakrishnan et al. | |
| 2012/0027104 A1 | 2/2012 | Bas et al. | |
| 2012/0030753 A1 | 2/2012 | Bas et al. | |
| 2012/0226965 A1 | 9/2012 | Hammerschmidt et al. | |
| 2012/0303836 A1 | 11/2012 | Ngo et al. | |
| 2013/0054850 A1 | 2/2013 | Co | |
| 2013/0124763 A1 | 5/2013 | Kessler | |
| 2013/0128724 A1 * | 5/2013 | Farley | H04L 12/10 370/225 |
| 2013/0132624 A1 | 5/2013 | Chen et al. | |
| 2013/0166801 A1 | 6/2013 | Chun et al. | |
| 2013/0197920 A1 | 8/2013 | Lesso et al. | |
| 2013/0265884 A1 | 10/2013 | Brombal et al. | |
| 2013/0301689 A1 | 11/2013 | Marchand et al. | |
| 2014/0025999 A1 | 1/2014 | Kessler | |
| 2014/0112339 A1 | 4/2014 | Safranek et al. | |
| 2014/0281593 A1 * | 9/2014 | Hayes | G06F 1/26 713/300 |
| 2014/0304442 A1 | 10/2014 | Hietala et al. | |
| 2014/0310436 A1 | 10/2014 | Du | |
| 2014/0376278 A1 | 12/2014 | Fornage et al. | |
| 2015/0056941 A1 | 2/2015 | Lin et al. | |
| 2015/0074306 A1 | 3/2015 | Ayyagari et al. | |
| 2015/0106541 A1 | 4/2015 | Southcombe et al. | |
| 2015/0127862 A1 | 5/2015 | Fan et al. | |
| 2015/0149673 A1 | 5/2015 | Balkan et al. | |
| 2015/0169482 A1 | 6/2015 | Ngo et al. | |
| 2015/0192974 A1 | 7/2015 | Ngo et al. | |
| 2015/0193297 A1 | 7/2015 | Ngo et al. | |
| 2015/0193298 A1 | 7/2015 | Ngo et al. | |
| 2015/0193321 A1 | 7/2015 | Ngo et al. | |
| 2015/0193373 A1 | 7/2015 | Ngo et al. | |
| 2016/0050513 A1 | 2/2016 | Wang et al. | |
| 2016/0124892 A1 | 5/2016 | Amarilio et al. | |
| 2017/0255250 A1 | 9/2017 | Ngo et al. | |
| 2017/0255578 A1 | 9/2017 | Ngo et al. | |
| 2017/0255579 A1 | 9/2017 | Ngo et al. | |
| 2017/0277651 A1 | 9/2017 | Ngo et al. | |
| 2017/0286340 A1 | 10/2017 | Ngo et al. | |
| 2018/0217959 A1 | 8/2018 | Ngo et al. | |
| 2019/0250876 A1 | 8/2019 | Amarilio et al. | |
| 2020/0151131 A1 | 5/2020 | Ngo et al. | |
| 2020/0334185 A1 | 10/2020 | Ngo et al. | |
| 2020/0394046 A1 | 12/2020 | Snelgrove et al. | |

OTHER PUBLICATIONS

International Search Report and Written Opinion for International Patent Application No. PCT/US2020/012702, dated Apr. 7, 2020, 17 pages.

Non-Final Office Action for U.S. Appl. No. 16/599,384, dated Aug. 24, 2020, 8 pages.

Final Office Action for U.S. Appl. No. 16/599,384, dated Dec. 1, 2020, 9 pages.

Non-Final Office Action for U.S. Appl. No. 16/549,116, dated Aug. 6, 2020, 9 pages.

Final Office Action for U.S. Appl. No. 16/549,116, dated Jan. 13, 2021, 9 pages.

Non-Final Office Action for U.S. Appl. No. 16/710,457, dated Aug. 28, 2020, 7 pages.

Non-Final Office Action for U.S. Appl. No. 14/575,491, dated May 26, 2017, 20 pages.

Non-Final Office Action for U.S. Appl. No. 14/659,379, dated Apr. 7, 2017, 37 pages.

Author Unknown, "1-Wire," Wikipedia, last modified Jan. 16, 2015, accessed Feb. 12, 2015, http://en.wikipedia.org/wiki/1-Wire, 4 pages.

Author Unknown, "DS1822: Econo 1-Wire Digital Thermometer," Maxim Integrated, 2007, 21 pages.

Author Unknown, "MAXIM 1-Wire® Tutorial," MAXIM, online audiovisual presentation, 17 slides, No Date, accessed Feb. 12, 2015, http://www.maximintegrated.com/products/1-wire/flash/overview/ (38 images of slides).

Awtry, Dan, et al., "Design Guide v1.0," Springbok Digitronics, Aug. 19, 2004, 96 pages.

Non-Final Office Action for U.S. Appl. No. 14/575,491, dated Nov. 30, 2017, 18 pages.

Non-Final Office Action for U.S. Appl. No. 14/659,292, dated Sep. 29, 2017, 27 pages.

(56) References Cited

OTHER PUBLICATIONS

Final Office Action for U.S. Appl. No. 14/659,292, dated Apr. 30, 2018, 24 pages.
Non-Final Office Action for U.S. Appl. No. 14/659,328, dated Sep. 8, 2017, 51 pages.
Final Office Action for U.S. Appl. No. 14/659,328, dated Mar. 20, 2018, 61 pages.
Notice of Allowance for U.S. Appl. No. 14/659,328, dated Jul. 2, 2018, 8 pages.
Non-Final Office Action for U.S. Appl. No. 14/659,355, dated Sep. 20, 2017, 32 pages.
Final Office Action for U.S. Appl. No. 14/659,355, dated Apr. 17, 2018, 11 pages.
Advisory Action for U.S. Appl. No. 14/659,355, dated Jul. 5, 2018, 3 pages.
Non-Final Office Action for U.S. Appl. No. 15/467,790, dated Jun. 28, 2018, 14 pages.
Ex Parte Quayle Action for U.S. Appl. No. 15/365,315, mailed Jul. 26, 2018, 7 pages.
Final Office Action for U.S. Appl. No. 14/659,379, dated Oct. 18, 2017, 44 pages.
Advisory Action for U.S. Appl. No. 14/659,379, dated Feb. 26, 2018, 3 pages.
Notice of Allowance for U.S. Appl. No. 14/659,379, dated Mar. 20, 2018, 10 pages.
Non-Final Office Action for U.S. Appl. No. 14/659,371, dated Sep. 25, 2017, 23 pages.
Final Office Action for U.S. Appl. No. 14/659,371, dated May 3, 2018, 21 pages.
Advisory Action for U.S. Appl. No. 14/659,371, dated Aug. 1, 2018, 3 pages.
Non-Final Office Action for U.S. Appl. No. 14/659,292, dated Dec. 21, 2018, 23 pages.
Final Office Action for U.S. Appl. No. 14/659,292, dated Jun. 4, 2019, 24 pages.
Non-Final Office Action for U.S. Appl. No. 14/659,355, dated Oct. 12, 2018, 8 pages.
Final Office Action for U.S. Appl. No. 14/659,355, dated May 2, 2019, 8 pages.
Non-Final Office Action for U.S. Appl. No. 15/886,209, dated May 17, 2019, 7 pages.
Non-Final Office Action for U.S. Appl. No. 14/659,371, dated Feb. 26, 2019, 22 pages.
Non-Final Office Action for U.S. Appl. No. 15/365,295, dated Mar. 29, 2019, 15 pages.
Final Office Action for U.S. Appl. No. 15/365,295, dated Aug. 15, 2019, 11 pages.
Final Office Action for U.S. Appl. No. 15/467,790, dated Nov. 5, 2018, 15 pages.
Advisory Action for U.S. Appl. No. 15/467,790, dated Feb. 26, 2019, 3 pages.
Notice of Allowance for U.S. Appl. No. 15/467,790, dated May 20, 2019, 8 pages.
Non-Final Office Action for U.S. Appl. No. 15/443,236, dated Nov. 16, 2018, 19 pages.
Final Office Action for U.S. Appl. No. 15/443,236, dated May 30, 2019, 20 pages.
Notice of Allowance and Examiner-Initiated Interview Summary for U.S. Appl. No. 15/365,315, dated Sep. 14, 2018, 9 pages.
Notice of Allowance for U.S. Appl. No. 15/472,756, dated Aug. 8, 2018, 8 pages.
Notice of Allowance for U.S. Appl. No. 15/886,209, dated Sep. 11, 2019, 7 pages.
Notice of Allowance for U.S. Appl. No. 16/402,613, dated Nov. 4, 2019, 9 pages.
Notice of Allowance for U.S. Appl. No. 16/407,397, dated Nov. 12, 2019, 7 pages.
Advisory Action for U.S. Appl. No. 15/365,295, dated Nov. 6, 2019, 3 pages.
Corrected Notice of Allowance for U.S. Appl. No. 15/467,790, dated Aug. 15, 2019, 6 pages.
Corrected Notice of Allowance for U.S. Appl. No. 15/467,790, dated Aug. 28, 2019, 6 pages.
Notice of Allowance for U.S. Appl. No. 15/443,236, dated Sep. 24, 2019, 8 pages.
Notice of Allowance for U.S. Appl. No. 15/365,295, dated Feb. 25, 2020, 8 pages.
Awtry, Dan, "Transmitting Data and Power over a One-Wire Bus," Sensors, Feb. 1997, Dallas Semiconductor, 4 pages.
Non-Final Office Action for U.S. Appl. No. 16/736,164, dated Feb. 27, 2020, 7 pages.
Final Office Action for U.S. Appl. No. 16/736,164, dated Jun. 2, 2020, 7 pages.
Non-Final Office Action for U.S. Appl. No. 16/736,164, dated Sep. 21, 2020, 8 pages.
Advisory Action for U.S. Appl. No. 16/736,164, dated Mar. 19, 2021, 3 pages.
Advisory Action for U.S. Appl. No. 16/549,116, dated Mar. 24, 2021, 3 pages.
Applicant-Initiated Interview Summary for U.S. Appl. No. 16/549,116, dated Aug. 18, 2021, 2 pages.
Notice of Allowance and Examiner-Initiated Interview Summary for U.S. Appl. No. 16/549,116, dated Sep. 14, 2021, 15 pages.
Non-Final Office Action for U.S. Appl. No. 17/095,204, dated Oct. 14, 2021, 8 pages.
Notice of Allowance for U.S. Appl. No. 16/736,164, dated Apr. 29, 2021, 8 pages.
Non-Final Office Action and Examiner-Initiated Interview Summary for U.S. Appl. No. 16/549,116, dated May 12, 2021, 10 pages.
Author Unknown, "IEEE Standard for Reduced-Pin and Enhanced-Functionality Test Access Point and Boundary-Scan Architecture," IEEE Std 1149.7™—2009, Feb. 10, 2010, IEEE, 1037 pages.
Kawoosa, M.S. et al., "Towards Single Pin Scan for Extremely Low Pin Count Test," 2018 31st International Conference on VLSI Design and 2018 17th International Conference on Embedded Systems (VLSID), Jan. 6-10, 2018, Pune, India, IEEE, 6 pages.
Notice of Allowance for U.S. Appl. No. 17/095,204, dated Mar. 17, 2022, 7 pages.

* cited by examiner

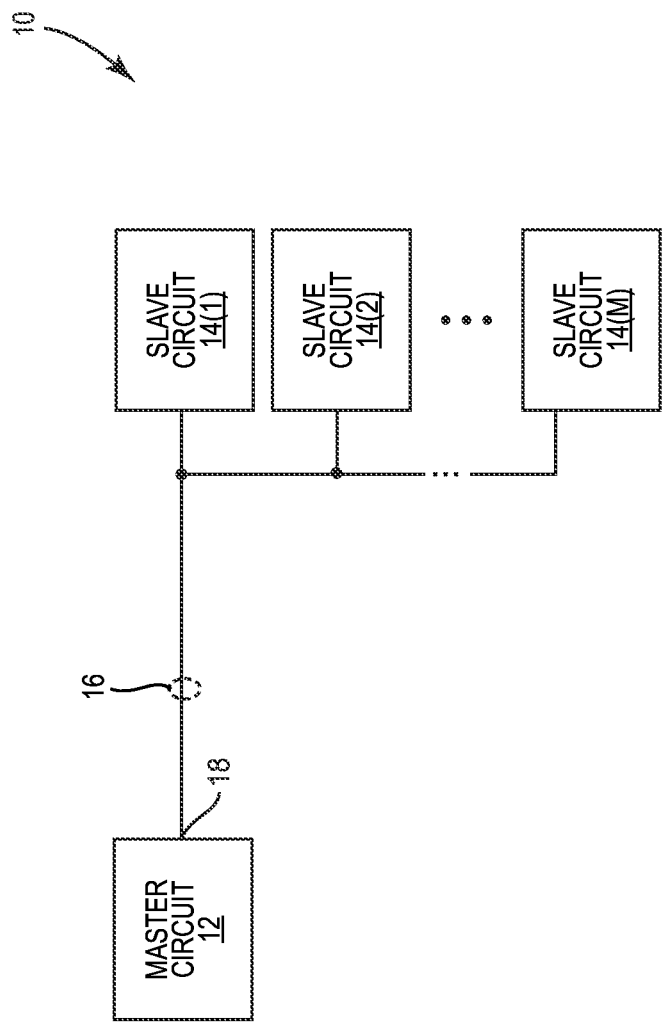

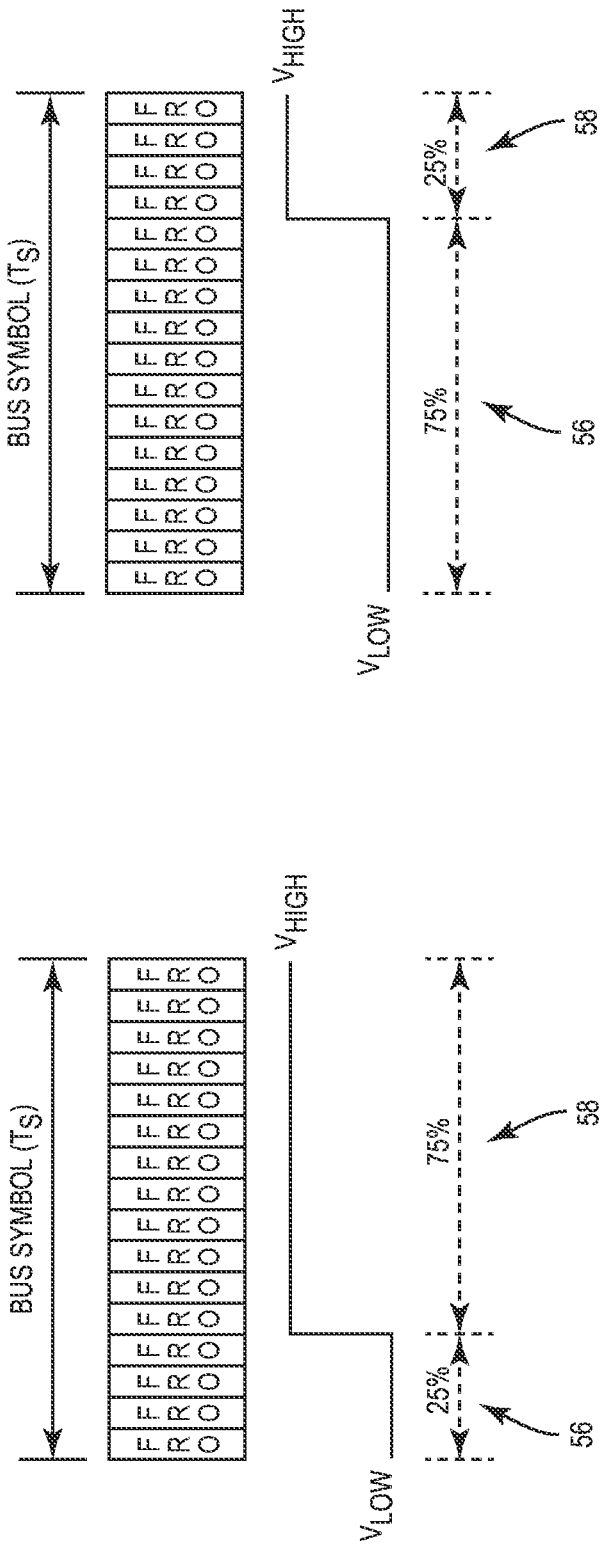

FULL-DUPLEX COMMUNICATIONS OVER A SINGLE-WIRE BUS

FIELD OF THE DISCLOSURE

The technology of the disclosure relates generally to full-duplex communications over a single-wire communication bus in an electronic device.

BACKGROUND

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by wireless communication technologies, such as Wi-Fi, long-term evolution (LTE), and fifth-generation new-radio (5G-NR). To achieve the higher data rates in mobile communication devices, a mobile communication device may employ a power amplifier(s) to amplify a radio frequency (RF) signal(s) to a higher output power prior to radiating the RF signal via an antenna(s).

However, the increased output power of RF signal(s) can lead to increased power consumption and thermal dissipation, thus compromising overall performance and user experiences. Envelope tracking (ET) is a power management technology designed to improve efficiency levels of PAs to help reduce power consumption and thermal dissipation in mobile communication devices. As such, it may be desirable to enable ET in mobile communication devices whenever possible. Notably, the RF signal(s) communicated in different wireless communication systems may correspond to different modulation bandwidths (e.g., from 80 KHz to over 200 MHz). As such, it may be further desirable to ensure that the power amplifier(s) can maintain optimal efficiency across a wide range of modulation bandwidth.

In many mobile communication devices, the power amplifier(s) and the antenna(s) are typically located in an RF front-end (RFFE) circuit communicatively coupled to a transceiver circuit(s) via an RFFE bus as defined in the MIPI® alliance specification for radio frequency front-end control interface, version 2.1. However, not all communications require a two-wire serial bus like the RFFE bus. In some cases, a single-wire serial bus may be sufficient or even desired for carrying out certain type of communications between circuits. As such, it may be possible to provide a single-wire bus, either concurrent to or independent of, the RFFE bus in a mobile communication device.

A conventional single-wire bus is typically configured to support half-duplex communications between a master circuit and a slave circuit(s). In this regard, the master circuit and the slave circuit(s) are taking turns to communicate forward (master to slave) and reverse (slave to master) bus telegrams over the single-wire bus. It is thus desirable to support full-duplex communications over the single-wire bus, whereby the master circuit and the slave circuit(s) can communicate the forward and reverse bus telegrams concurrently, to help improve efficiency, cost, and power consumption.

SUMMARY

Aspects disclosed in the detailed description are related to full-duplex communications over a single-wire bus. In embodiments disclosed herein, a master circuit and a slave circuit(s) are able to communicate forward (master to slave) bus telegrams and reverse (slave to master) bus telegrams concurrently over a single-wire bus consisting of one wire. Specifically, the master circuit is configured to modulate the forward bus telegrams based on voltage pulse-width modulation (PWM), while the slave circuit(s) is configured to modulate the reverse bus telegrams based on current variations. In addition, the slave circuit(s) is further configured to harvest power from the master circuit concurrent to receiving the forward bus telegrams and sending the reverse bus telegrams. By supporting full-duplex communications over the single-wire bus, it is possible to improve efficiency, cost, and power consumption in an electronic device wherein the single-wire bus is deployed.

In one aspect, a single-wire bus apparatus is provided. The single-wire bus apparatus includes a single-wire bus consisting of one wire. The single-wire bus apparatus also includes at least one slave circuit coupled to the single-wire bus. The single-wire bus apparatus also includes a master circuit. The master circuit includes a bus driver circuit coupled to the single-wire bus. The bus driver circuit is configured to communicate, over the single-wire bus, one or more voltage PWM values in one or more bus symbols, respectively. The bus driver circuit is also configured to determine whether a current variation occurs on the single-wire bus in each of the one or more bus symbols. The master circuit also includes a receiver circuit coupled to the bus driver circuit. The receiver circuit is configured to, for each of the one or more bus symbols output a first binary value if the current variation occurs and output a second binary value different from the first binary value if the current variation does not occur.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

FIG. 1A is a schematic diagram of an exemplary conventional single-wire bus apparatus in which a master circuit is configured to communicate with a slave circuit(s) over a single-wire bus;

FIG. 1D is a schematic diagram providing an exemplary illustration of a bus symbol modulated based on voltage pulse-width modulation (PWM) to represent a voltage PWM value one ("1");

FIG. 1E is a schematic diagram providing an exemplary illustration of a bus symbol modulated based on voltage PWM to represent a voltage PWM value zero ("0");

DETAILED DESCRIPTION

Figure 1B:
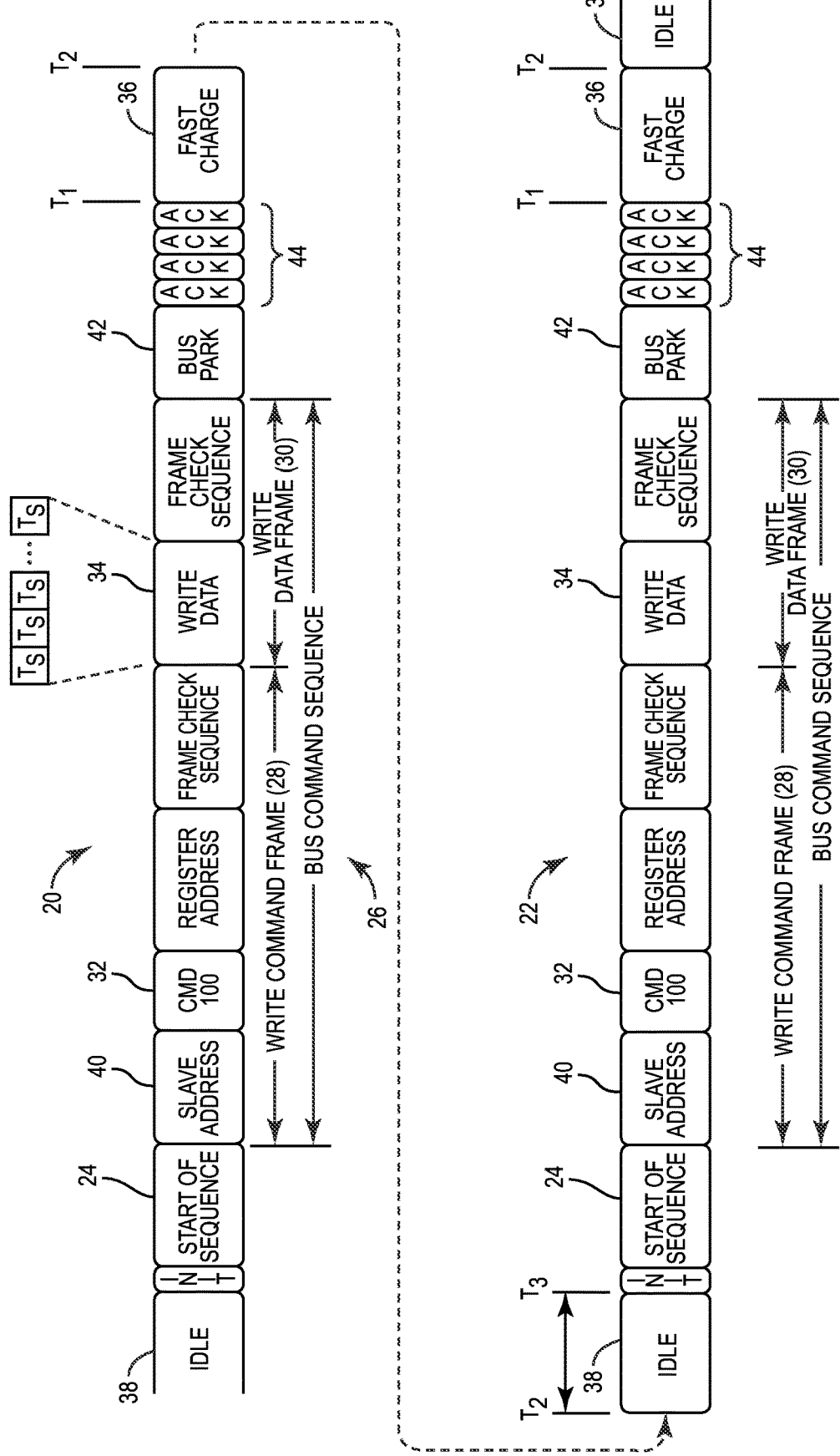
FIG. 1B is a schematic diagram providing an exemplary illustration of one or more bus telegrams communicated from the master circuit to the slave circuit(s) over the single-wire bus of FIG. 1A.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description are related to full-duplex communications over a single-wire bus. In embodiments disclosed herein, a master circuit and a slave circuit(s) are able to communicate forward (master to slave) bus telegrams and reverse (slave to master) bus telegrams concurrently over a single-wire bus consisting of one wire. Specifically, the master circuit is configured to modulate the forward bus telegrams based on voltage pulse-width modulation (PWM), while the slave circuit(s) is configured to modulate the reverse bus telegrams based on current variations. In addition, the slave circuit(s) is further configured to harvest power from the master circuit concurrent to receiving the forward bus telegrams and sending the reverse bus telegrams. By supporting full-duplex communications over the single-wire bus, it is possible to improve efficiency, cost, and power consumption in an electronic device wherein the single-wire bus is deployed.

Figure 1C:
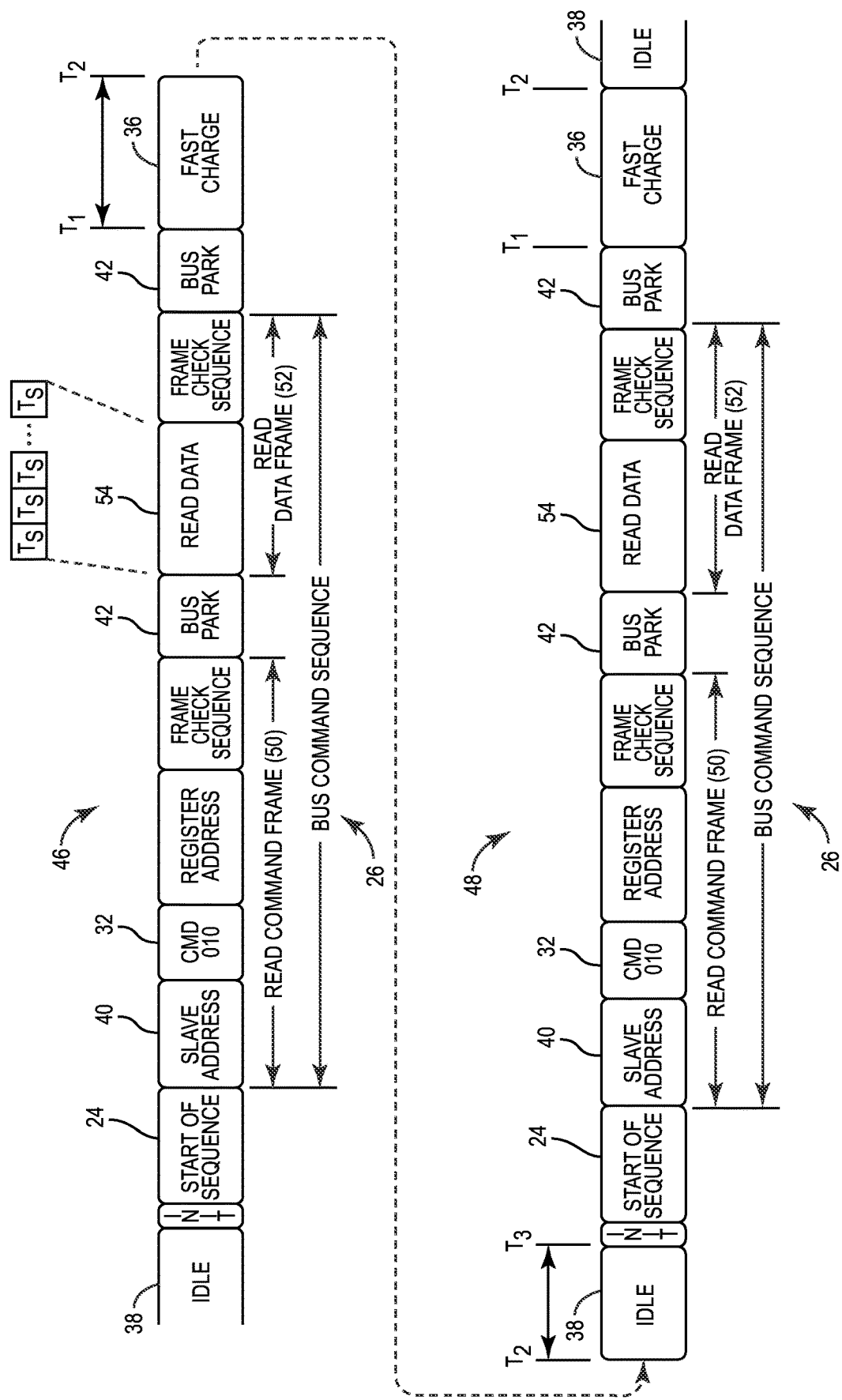
FIG. 1C is a schematic diagram providing an exemplary illustration of one or more bus telegrams communicated from the slave circuit(s) to the master circuit over the single-wire bus of FIG. 1A.
Figure 2:
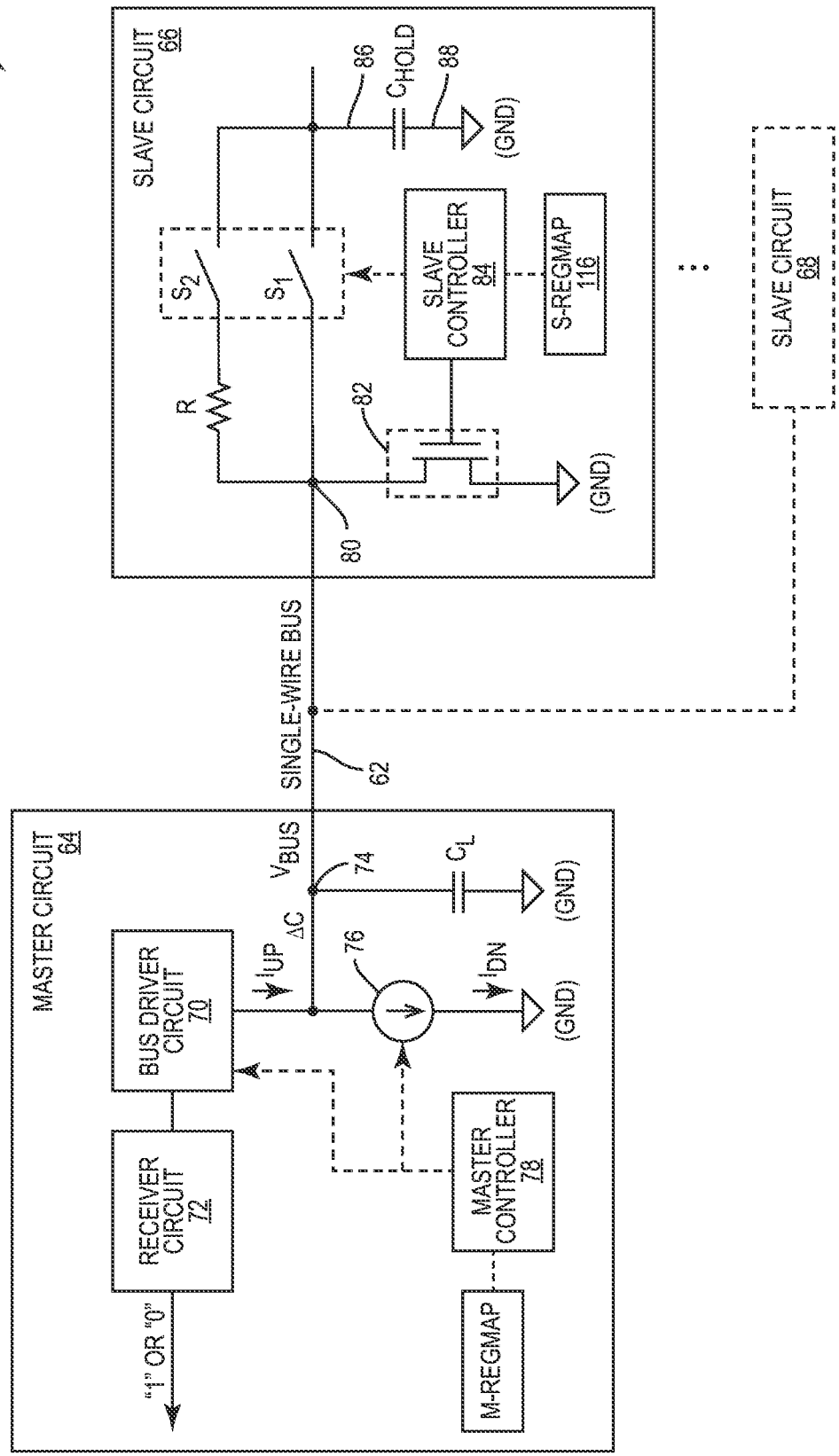
FIG. 2 is a schematic diagram of an exemplary single-wire bus apparatus configured according to an embodiment of the present disclosure to support full-duplex communications over a single-wire bus consisting of one wire.

Before discussing a single-wire bus apparatus of the present disclosure, starting at FIG. 2, a brief overview of a conventional single-wire bus apparatus is first provided with reference to FIGS. 1A-1E to help understand basic operations of the conventional single-wire bus and formats of bus telegrams.

In this regard, FIG. 1A is a schematic diagram of an exemplary conventional single-wire bus apparatus 10 in which a master circuit 12 is configured to communicate with a number of slave circuits 14(1)-14(M) over a half-duplex single-wire bus 16 coupled to a master port 18. As such, the master circuit 12 and the slave circuits 14(1)-14(M) may only communicate to each other in an alternate fashion (e.g., by time-division).

The master circuit 12 is configured to always initiate a bus telegram communication over the half-duplex single-wire bus 16 by communicating a bus telegram(s) to one or more of the slave circuits 14(1)-14(M). As such, the conventional single-wire bus apparatus 10 is also known as a "master-slave bus architecture." The slave circuits 14(1)-14(M) may provide a data payload(s) to the master circuit 12 over the half-duplex single-wire bus 16 in response to receiving the bus telegram(s) from the master circuit 12. Hereinafter, the bus telegram(s) communicated from the master circuit 12 to the slave circuits 14(1)-14(M) is referred to as "a forward bus telegram(s)" and the data payload(s) communicated from the slave circuits 14(1)-14(M) to the master circuit 12 are referred to as "a reverse bus telegram(s)."

FIG. 1B is a schematic diagram providing an exemplary illustration of one or more bus telegrams 20, 22 communicated from the master circuit 12 to any of the slave circuits 14(1)-14(M) over the half-duplex single-wire bus 16 of FIG. 1A. Each of the bus telegrams 20, 22 includes a start of sequence (SOS) sequence 24 and a bus command sequence 26. The bus command sequence 26 includes a write command frame 28 and a write data frame 30. The write command frame 28 includes a command field 32 (denoted as "CMD"), which is encoded with a binary value "100" to indicate a register-write operation. The write data frame 30 includes a write data period 34. The write data period 34 can include one or more write data symbols $T_S$ modulated to carry data to the slave circuits 14(1)-14(M) during the register-write operation. In this regard, the bus telegrams 20, 22 may be an example of the forward bus telegram(s).

The SOS sequence 24 always precedes the bus command sequence 26 and is always communicated from the master circuit 12 to the slave circuits 14(1)-14(M). The bus telegram 22, which succeeds the bus telegram 20, may be separated from the bus telegram 20 by a fast-charge period 36 that starts at time $T_1$ and ends at time $T_2$ ($T_2 > T_1$) and an idle period 38 that starts at time $T_2$ and ends at time $T_3$ ($T_3 > T_2$). The fast-charge period 36 is configured to allow each of the slave circuits 14(1)-14(M) to draw a higher charging current via the half-duplex single-wire bus 16 and harvest power from the higher charging current. In this regard, the half-duplex single-wire bus 16 is said to be in a fast-charge state during the fast-charge period 36. The idle period 38 may be a no-activity period in which the master circuit 12 and the slave circuits 14(1)-14(M) may be inactive to help conserve power. Accordingly, the half-duplex single-wire bus 16 is said to be in an idle state during the idle period 38. During the fast-charge period 36 and the idle period 38, the half-duplex single-wire bus 16 is maintained at a bus voltage that is greater than zero volts (0 V).

The master circuit 12 is configured to suspend the bus telegram communication over the half-duplex single-wire bus 16 during the fast-charge period 36 and the idle period 38. Accordingly, the master circuit 12 and the slave circuits 14(1)-14(M) are configured to refrain from communicating bus telegram(s) and data payload(s) from time $T_1$ to $T_3$. In this regard, the half-duplex single-wire bus 16 can be said to be in a suspension mode between time $T_1$ and $T_3$.

The bus command sequence includes a slave address field 40 and is followed by a bus park period 42 and subsequently four acknowledgement (ACK) symbols 44. The slave address field 40 can be used to address the slave circuits 14(1)-14(M). The bus park period 42 may be used to switch between the forward and the reverse communication modes. The ACK symbols 44 can be used by up to four of the slave circuits 14(1)-14(M) to acknowledge respective receipt of the data carried in the write data period 34. Given that the ACK symbols 44 are communicated immediately before the fast-charge period 36, each of the slave circuits 14(1)-14(M) can determine the time $T_1$ to start the fast-charge period 36 by counting four ACKs communicated in the four ACK symbols 44 from the end of the bus park period 42.

Each of the slave circuits 14(1)-14(M) is uniquely identified by a respective unique slave identification (USID). As such, the bus command sequence 26 in the bus telegrams 20, 22 can be a unicast command sequence destined to any one of the slave circuits 14(1)-14(M) when the slave address field 40 contains the USID of the any one of the slave circuits 14(1)-14(M). The bus command sequence 26 in the bus telegrams 20, 22 can also be a multicast command sequence destined to a subset of the slave circuits 14(1)-14(M) when the slave address field 40 contains a group slave identification (GSID) corresponding to the subset of the slave circuits 14(1)-14(M). Furthermore, the bus command sequence 26 in the bus telegrams 20, 22 can be a broadcast command sequence destined to all of the slave circuits 14(1)-14(M) when the slave address field 40 contains a broadcast slave identification (BSID).

FIG. 1C is a schematic diagram providing an exemplary illustration of one or more bus telegrams 46, 48 communicated from the slave circuits 14(1)-14(M) to the master circuit 12 over the half-duplex single-wire bus 16 of FIG. 1A. Common elements between FIGS. 1B and 1C are shown therein with common element numbers and will not be re-described herein.

Each of the bus telegrams 46, 48 includes the bus command sequence 26. The bus command sequence 26 includes a read command frame 50 and a read data frame 52, separated by a bus park period 42. The read command frame 50 includes the command field 32 (denoted as "CMD"), which is encoded with a binary value "010" to indicate a register-read operation. The read data frame 52 includes a read data period 54, which includes one or more read data symbols $T_S$ modulated to carry data payloads to the master circuit 12 during the register-read operation. The master circuit 12 first communicates the read command frame 50 to the slave circuits 14(1)-14(M) identified by the slave address field 40 to initiate the register-read operation. The master circuit 12 then tri-states during the bus park period 42 to yield control of the half-duplex single-wire bus 16 to the slave circuits 14(1)-14(M). Subsequently, the slave circuits 14(1)-14(M) can begin sending the data payloads in the read data period 54. In this regard, the bus telegrams 46, 48 may be an example of both the forward and the reverse bus telegram(s).

Given that the master circuit 12 must refrain from sending anything during in the read data frame 52, the slave circuits 14(1)-14(M) are unable to harvest any power from the master circuit 12 when communicating the read data frame 52. Instead, the slave circuits 14(1)-14(M) must rely on the power harvested during the fast-charge period 36 and/or while receiving the forward bus telegram(s) 20, 22 to carry out the register-read operation.

In the conventional single-wire bus apparatus 10, the write data symbols $T_S$ in the write data period 34 and the read data symbols $T_S$ in the read data period 54 are each modulated based on voltage PWM, as illustrated in FIGS. 1D and 1E. FIG. 1D is a schematic diagram providing an exemplary illustration of a bus symbol $T_S$ modulated based on voltage PWM to represent a voltage PWM value one ("1").

The bus symbol $T_S$, which can be any of the write data symbols $T_S$ and the read data symbols $T_S$, is modulated based on a predefined low-voltage interval 56 and a predefined high-voltage interval 58 that are configured according to a predefined configuration ratio. To represent the voltage PWM value "1," the predefined low-voltage interval 56 is shorter than the predefined high-voltage interval 58. For example, the bus symbol $T_S$ can include sixteen (16) free-running oscillators (FROs) or 16 digitally controlled oscillators (DCOs) and the predefined configuration ratio between the predefined low-voltage interval 56 and the predefined high-voltage interval 58 is 25% to 75% (or 1 to 3). In a non-limiting example, the FROs are derived from a local clock running in the slave circuits 14(1)-14(M) and the DCOs are derived from a clock running at the master circuit 12. Accordingly, the predefined low-voltage interval 56 lasts for four (4) FROs or DCOs and the predefined high-voltage interval 58 lasts for eight (8) FROs or DCOs.

In this regard, to modulate the bus symbol $T_S$ to represent the voltage PWM value "1," a lower bus voltage $V_{LOW}$ is first asserted on the half-duplex single-wire bus 16 for the predefined low-voltage interval 56 and then a higher bus voltage $V_{HIGH}$ is asserted on the half-duplex single-wire bus 16 for the predefined high-voltage interval 58.

FIG. 1E is a schematic diagram providing an exemplary illustration of a voltage PWM symbol $T_S$ modulated to represent a voltage PWM value zero ("0"). Common elements between FIGS. 1D and 1E are shown therein with common element numbers and will not be re-described herein.

To represent the voltage PWM value "0," the predefined low-voltage interval 56 is longer than the predefined high-voltage interval 58. Based on the same example in FIG. 1D, the predefined low-voltage interval 56 lasts for 8 FROs or DCOs and the predefined high-voltage interval 58 lasts for 4 FROs or DCOs. Accordingly, to modulate the bus symbol $T_S$ to represent the voltage PWM value "0," a lower bus voltage $V_{LOW}$ is first asserted on the half-duplex single-wire bus 16 for the predefined low-voltage interval 56 and then a higher bus voltage $V_{HIGH}$ is asserted on the half-duplex single-wire bus 16 for the predefined high-voltage interval 58.

As previously discussed in FIG. 1C, the slave circuits 14(1)-14(M) are unable to harvest power from the master circuit 12 while communicating the reverse bus telegrams (s). Instead, the slave circuits 14(1)-14(M) must communicate the reverse bus telegram(s) based on power harvested during the fast-charge period 36 and/or while receiving the forward bus telegram(s) 20, 22. In the conventional single-wire bus apparatus 10, the slave circuits 14(1)-14(M) are typically configured to harvest power by charging a large holding capacitor with the higher charging current drawn during the fast-charge period 36. As such, the holding capacitor needs to be sufficiently large to help reduce power drooping when the slave circuits 14(1)-14(M) communicate the reverse bus telegrams(s) and/or perform other operations (e.g., measurement). However, it may be undesirable and cost inefficient to employ the large holding capacitor in an electronic device (e.g., a smartphone) that continue to miniaturize. As such, it is desirable to upgrade the half-duplex single-wire bus 16 to a full-duplex single-wire bus to allow the slave circuits 14(1)-14(M) to continue harvest power while communicating the reverse bus telegrams(s).

In this regard, FIG. 2 is a schematic diagram of an exemplary single-wire bus apparatus 60 configured according to an embodiment of the present disclosure to support full-duplex communications over a single-wire bus 62 consisting of one wire. The single-wire bus apparatus 60 includes a master circuit 64 coupled to at least one slave circuit 66 via the single-wire bus 62. It should be appreciated that the master circuit 64 can support additional slave circuits, such as one or more slave circuits 68, via the single-wire bus 62 based on a master-slave topology similar to the conventional single-wire bus apparatus 10 of FIG. 1A.

As discussed in detail below, the master circuit 64 and the slave circuit 66 are configured to communicate forward (master to slave) bus telegrams and reverse (slave to master) bus telegrams concurrently over the single-wire bus 62, thus making it possible to support full-duplex communications over the single-wire bus 62. As a result, it is possible to improve efficiency, cost, and power consumption in an electronic device wherein the single-wire bus apparatus 60 is deployed.

The master circuit 64 includes a bus driver circuit 70 and a receiver circuit 72. The bus driver circuit 70 is coupled to the single-wire bus 62. In a non-limiting example, the bus driver circuit 70 is configured to initiate a register-read operation by sending the read command frame 50 in FIG. 1C to the slave circuit 66. In contrast to any of the slave circuits 14(1)-14(M) in FIG. 1A, the slave circuit 66 is configured to modulate data payloads sent in each of the read data symbols $T_S$ of the read data frame 52 by causing or not causing a current variation $\Delta C$ on the single-wire bus 62. The bus driver circuit 70, on the other hand, is configured to determine whether the current variation $\Delta C$ occurs on the single-wire bus 62 during each of the read data symbols $T_S$. Accordingly, the receiver circuit 72 includes a binary output $B_{OUT}$ configured to output a first binary value (e.g., binary "1") or a second binary value (e.g., binary "0") based on presence or absence of the current variation $\Delta C$ in each of the read data symbols $T_S$.

Because the data payloads are modulated in each of the read data symbols $T_S$ based on presence or absence of the current variation $\Delta C$, the bus driver circuit 70 is no longer prohibited from sending data during the read data period 54. As such, the bus driver circuit 70 can be configured to communicate one or more voltage PWM values, such as the voltage PWM value "1" of FIG. 1D and/or the voltage PWM value "0" of FIG. 1E, in the read data symbols $T_S$ (referred generally to as "bus symbols" herein), respectively. Like the master circuit 12 in the conventional single-wire bus apparatus 10, the master circuit 64 is configured to modulate the voltage PWM values in the same fashion as illustrated in the examples of FIGS. 1D and 1E.

By making it possible for the bus driver circuit 70 and the slave circuit 66 to concurrently communicate in the read data frame 52, the single-wire bus 62 becomes capable of supporting full-duplex communications, at least in the read data frame 52. In addition, by allowing the bus driver circuit 70 to communicate in the read data frame 52, the slave circuit 66 can continue to harvest power from the master circuit 64 during the read data frame 52. As a result, the slave circuit 66 can sustain a prolonged register-read operation without suffering potential power drooping issues, thus helping to improve reliability of the single-wire bus apparatus 60. More detail on how the slave circuit 66 can harvest power during the read data frame 52 will be provided later in this disclosure.

Notably, the first binary value and the second binary value outputted by the receiver circuit 72 can be related or unrelated to the voltage PWM values communicated by the bus driver circuit 70 in the read data frame 52. In fact, the bus driver circuit 70 may communicate any data to the slave circuit 66 in the read data frame 52.

In one embodiment, the bus driver circuit 70 may modulate each of the voltage PWM values in the read data frame 52 to equal the voltage PWM value one ("1") shown in FIG. 1D. In another embodiment, the bus driver circuit 70 may modulate each of the voltage PWM values in the read data frame 52 to equal the voltage PWM value zero ("0") shown in FIG. 1E. In another embodiment, the bus driver circuit 70 may arbitrarily modulate each of the voltage PWM values in the read data frame 52 to equal the voltage PWM value one ("1") and/or the voltage PWM value zero ("0"). In another embodiment, the bus driver circuit 70 may modulate each of the voltage PWM values in the read data frame 52 to repeat the first binary value or a second binary value last (a.k.a. most recently) outputted by the receiver circuit 72.

In addition to enabling the slave circuit 66 to continue harvesting power during the read data frame 52, the master circuit 64 may also help the slave circuit 66 to conserve power by acknowledging the write data frame 30, as shown in FIG. 1B, on behalf of the slave circuit 66. In this regard, the bus driver circuit 70 is configured to communicate a voltage PWM value in a respective one of the ACK symbols 44 (also referred generally to as "bus symbols" herein) that succeed the write data frame 30. In a non-limiting example, the bus driver circuit 70 modulates the voltage PWM value in the respective one of the ACK symbols 44 to indicate an ACK (e.g., voltage PWM value "1").

As illustrated in FIG. 1B, the ACK symbols 44 are sandwiched between the bus park period 42 and the fast-charge period 36. As such, it is possible to determine the time $T_1$ to start the fast-charge period 36 by counting the four ACKs communicated in the four ACK symbols 44 from the end of the bus park period 42. In this regard, by configuring the bus driver circuit 70 to communicate the ACK on behalf of the slave circuit 66, it is possible to consistently count the four ACKs to accurately determine the start of the fast-charge period 36. In addition, by configuring the bus driver circuit 70 to communicate the ACK on behalf of the slave circuit 66, it is possible to reduce power consumption in the slave circuit 66, thus helping to further improve reliability of the single-wire bus apparatus 60.

Notably, the bus driver circuit 70 acknowledges the write data frame 30 without knowing whether the slave circuit 66 has indeed received the write data frame 30 with a correct frame check sequence. As such, the slave circuit 66 needs to confirm or disconfirm the ACK communicated by the bus driver circuit 70 in the respective one of the ACK symbols 44. In a non-limiting example, the slave circuit 66 can confirm or disconfirm the ACK by causing or not causing a current variation ΔC on the single-wire bus 62.

In this regard, the bus driver circuit 70 is configured to determine, either concurrent to or after communicating the ACK, whether the current variation ΔC occurs in the respective one of the ACK symbols 44. Accordingly, the receiver circuit 72 can output an indication indicating an ACK from the slave circuit 66 in the presence of the current variation ΔC. In contrast, the receiver circuit 72 can output the indication indicating a No-ACK (NACK) from the slave circuit 66 in the absence of the current variation ΔC.

The master circuit 64 also includes a master port 74, a master current sink 76, and a master controller 78. The master port 74 is coupled to the single-wire bus 62 and the bus driver circuit 70. The master current sink 76 is coupled between the master port 74 and a ground (GND). The master controller 78, which can be a microcontroller or a microprocessor for example, is configured to control the bus driver circuit 70 and/or the master current sink 76 to cause the master circuit 64 to modulate the voltage PWM values in the bus symbols $T_S$ (e.g., the read data symbols $T_S$ in the read data frame 52 and the ACK symbols 44), respectively. The master circuit 64 also includes an electromagnetic interference (EMI) capacitor $C_L$ coupled between the master port 74 and the GND. Notably, the EMI capacitor $C_L$ corresponds to a total EMI capacitance of the single-wire bus 62, which may vary depending on the number of slave circuits, any added capacitance, and effective capacitance increases due to increased length of the single-wire bus 62.

The slave circuit 66 can include a slave port 80, a slave current sink 82, a holding capacitor $C_{HOLD}$, and a slave controller 84. The slave port 80 is coupled to the single-wire bus 62. The slave current sink 82, which can be an N-type transistor for example, is coupled between the slave port 80 and the GND. The holding capacitor $C_{HOLD}$ has a first end 86 coupled to the slave port 80 via a charge switch $S_1$ and a second end 88 coupled to the GND. The slave controller 84, which can be a microcontroller or a microprocessor for example, is coupled to the slave current sink 82 and the charge switch $S_1$. The slave circuit 66 also includes an idle switch $S_2$ and a resistor R that are coupled in series between the slave port 80 and the first end 86 of the holding capacitor $C_{HOLD}$. The idle switch $S_2$ is closed during the idle period 38 in FIGS. 1B and 1C and opened otherwise.

Specific embodiments related to support full-duplex communications over the single-wire bus 62 are discussed below in reference to FIGS. 3-6B. Common elements between FIGS. 2 and 3-6B are shown and/or referenced therein with common element numbers and will not be re-described herein.

Figure 3:
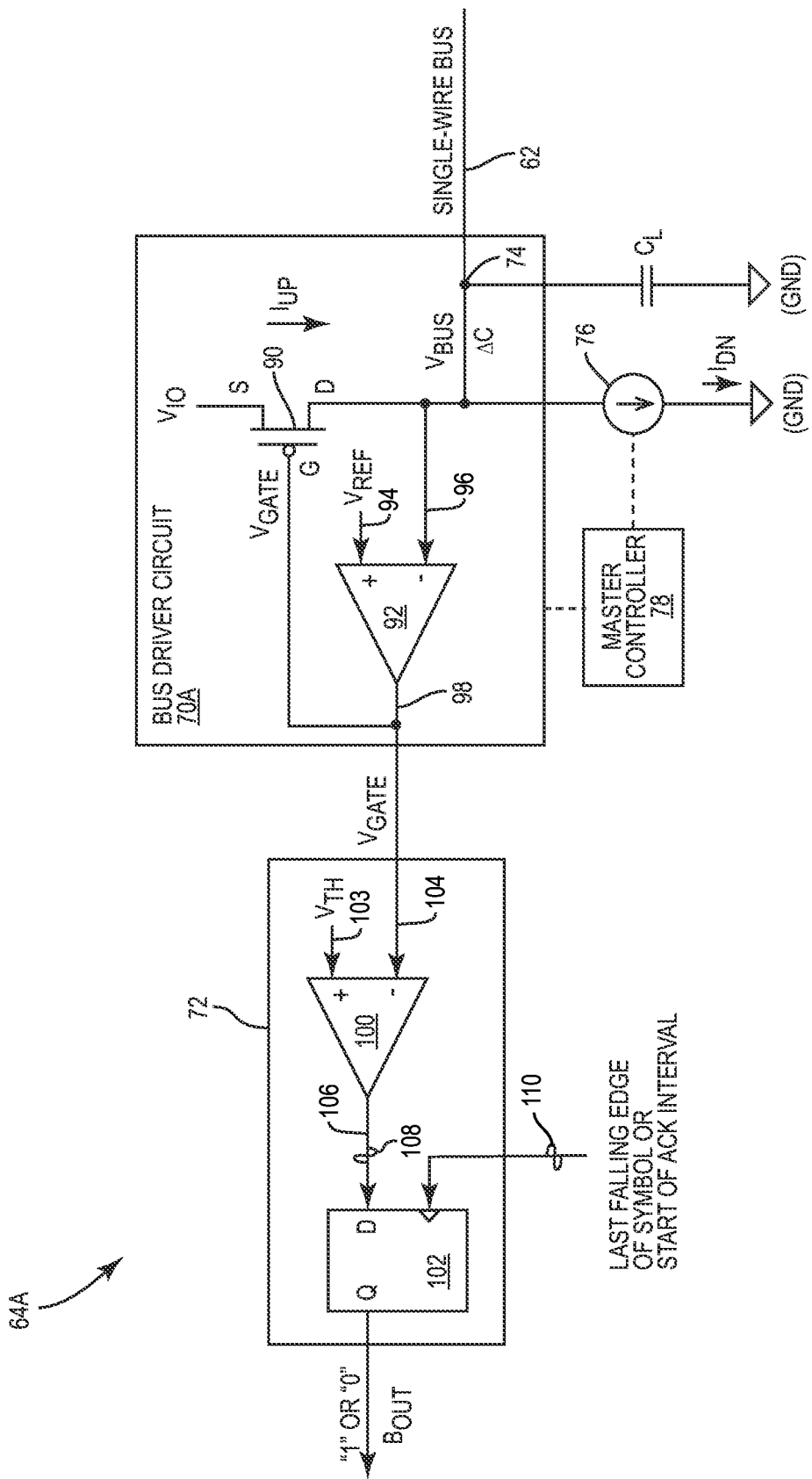
FIG. 3 is a schematic diagram of an exemplary master circuit configured according to a closed loop configuration.

In one embodiment, the master circuit 64 can be configured based on a closed loop configuration. In this regard, FIG. 3 is a schematic diagram of an exemplary master circuit 64A configured according to a closed loop configuration.

The master circuit 64A includes a bus driver circuit 70A. In a non-limiting example, the bus driver circuit 70A is a low dropout (LDO) master current source. The bus driver circuit 70A includes a transistor 90, which can be a P-type transistor as an example. The transistor 90 includes a gate electrode G configured to receive a gate voltage $V_{GATE}$, a source electrode S configured to receive a supply voltage $V_{IO}$ (e.g., 1.2 V), and a drain electrode D coupled to the master port 74 and configured to assert a bus voltage $V_{BUS}$ on the single-wire bus 62. The bus driver circuit 70A also includes a reference comparator 92. The reference comparator 92 includes a first input 94, a second input 96, and an output 98. The first input 94 is configured to receive a reference voltage $V_{REF}$ that is substantially close to the supply voltage $V_{IO}$ (e.g., $V_{REF}=V_{IO}-20\sim30$ mV). The second input 96 is coupled to the drain electrode D to receive the bus voltage $V_{BUS}$. The output 98 is coupled to the gate electrode G and configured to output the gate voltage $V_{GATE}$.

The receiver circuit 72 includes a comparator 100 and a D type flip flop 102. The comparator 100 includes a third input 103, a fourth input 104, and a second output 106. The third input 103 is configured to receive a threshold voltage $V_{TH}$. The fourth input 104 is coupled to the output 98 to receive the gate voltage $V_{GATE}$. In this regard, the comparator 100 is configured to compare the gate voltage $V_{GATE}$ against the threshold voltage $V_{TH}$. Accordingly, the second output 106 is configured to output an indication signal 108 that indicates whether the gate voltage $V_{GATE}$ is lower than the threshold voltage $V_{TH}$.

The D type flip flop 102 is coupled to the second output 106 to receive the indication signal 108. The D type flip flop 102 outputs the first binary value (e.g., "1") via the binary output $B_{OUT}$ when the indication signal 108 indicates that the gate voltage $V_{GATE}$ is lower than the threshold voltage $V_{TH}$ and outputs the second binary value (e.g., "0") via the binary output $B_{OUT}$ otherwise. In a non-limiting example, the D type flip flop 102 can be controlled by a control signal 110 to output the first binary value or the second binary value at a last falling edge of the read data symbols $T_S$ or at a start of the ACK symbols 44.

Figure 4A:
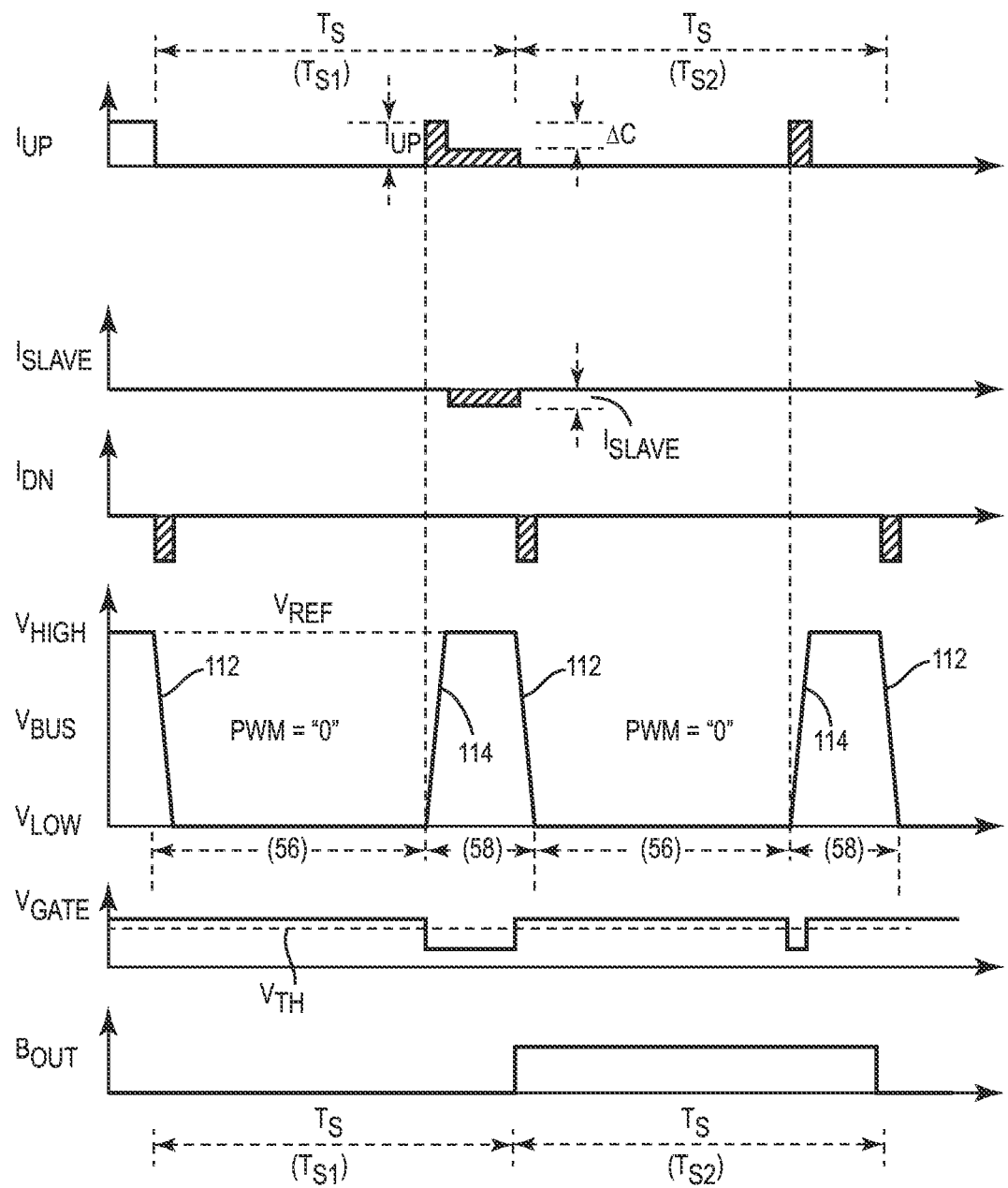
FIG. 4A is an exemplary illustration of how the master circuit of FIG. 3 and a slave circuit in the single-wire bus apparatus of FIG. 2 can be configured to support full-duplex communications on the single-wire bus during a read data frame in the bus telegrams of FIG. 1C.

FIG. 4A is an exemplary illustration on how the master circuit 64A of FIG. 3 and the slave circuit 66 in FIG. 2 can be configured to support full-duplex communications on the single-wire bus 62 during the read data frame 52 in FIG. 1C.

In this example, the bus driver circuit 70A is configured to communicate a voltage PWM value "0" in each of the read data symbols $T_S$ during the read data frame 52. As such, based on previous discussions in FIG. 1E, the bus driver circuit 70A will modulate the voltage PWM value "0" in each of the read data symbols $T_S$ by first asserting the bus voltage $V_{BUS}$ at the lower bus voltage $V_{LOW}$ for the predefined low-voltage interval 56 and then raise the bus voltage $V_{BUS}$ to the higher bus voltage $V_{HIGH}$ for the predefined high-voltage interval 58.

To assert the bus voltage $V_{BUS}$ at the lower bus voltage $V_{LOW}$, the master controller 78 is configured to deactivate the transistor 90 and activate the master current sink 76 to induce a sink current $I_{DN}$ at a falling edge 112 of the voltage PWM value "0" in each of the read data symbols $T_S$. In contrast, to raise the bus voltage $V_{BUS}$ to the higher bus voltage $V_{HIGH}$, the master controller 78 is configured to activate the transistor 90 and deactivate the master current sink 76. In a non-limiting example, the higher bus voltage $V_{HIGH}$ can be equal to the supply voltage $V_{IO}$ before the slave circuit 66 causing any current variation $\Delta C$ on the single-wire bus 62. Accordingly, the transistor 90 will provide a source current $I_{UP}$ at a rising edge 114 of the voltage PWM value "0" in each of the read data symbols $T_S$.

In this example, the slave circuit 66 is configured to send a binary "1" in a first of the read data symbol $T_S$ (denoted as "$T_{S1}$") and a binary "0" in a second of the read data symbols $T_S$ (denoted as "$T_{S2}$"). In this regard, in the first read data symbol $T_{S1}$, the slave controller 84 deactivates the slave current sink 82 during the predefined low-voltage interval 56 and activates the slave current sink 82 during the predefined high-voltage interval 58. When activated, the slave current sink 82 draws a slave current $I_{SLAVE}$ from the master circuit 64A to reduce the source current $I_{UP}$, thus causing the current variation $\Delta C$ ($\Delta C = I_{UP} - I_{SLAVE}$) on the single-wire bus 62.

Notably, the current variation $\Delta C$ can cause the bus voltage $V_{BUS}$ to drop from the higher bus voltage $V_{HIGH}$. In this regard, the reference comparator 92 compares the bus voltage $V_{BUS}$ against the reference voltage $V_{REF}$. If the bus voltage $V_{BUS}$ falls below the reference voltage $V_{REF}$, the reference comparator 92 will reduce the gate voltage $V_{GATE}$ at the gate electrode G to help maintain the higher bus voltage $V_{HIGH}$ at the reference voltage $V_{REF}$. In this regard, if the gate voltage $V_{GATE}$ is reduced, it is an indication that the current variation $\Delta C$ is present on the single-wire bus 62. In contrast, if the gate voltage $V_{GATE}$ is not reduced, it is an indication that the current variation $\Delta C$ is absent on the single-wire bus 62. When the gate voltage $V_{GATE}$ falls below the threshold voltage $V_{TH}$, the receiver circuit 72 will output binary "1" at the binary output $B_{OUT}$.

In the second read data symbol $T_{S2}$, the slave controller 84 deactivates the slave current sink 82 during both the predefined low-voltage interval 56 and the predefined high-voltage interval 58. As a result, the slave circuit 66 will not draw the slave current $I_{SLAVE}$ from the master circuit 64A to reduce the source current $I_{UP}$, thus not causing the current variation $\Delta C$ on the single-wire bus 62. Accordingly, the higher bus voltage $V_{HIGH}$ and the gate voltage $V_{GATE}$ will not be reduced. As such, the gate voltage $V_{GATE}$ will not fall below the threshold voltage $V_{TH}$ and the receiver circuit 72 will output binary "0" at the binary output $B_{OUT}$.

With reference back to FIG. 2, given that the slave circuit 66 is configured to cause the current variation $\Delta C$ by drawing the slave current $I_{SLAVE}$ from the master circuit 64, the slave circuit 66 will not discharge the holding capacitor $C_{HOLD}$. Instead, the slave circuit 66 can opportunistically charge the holding capacitor $C_{HOLD}$ during the read data frame 52 to harvest power. In this regard, the slave controller 84 will close the charge switch $S_1$ during the predefined high-voltage interval 58 to continue charge the holding capacitor $C_{HOLD}$. The slave controller 84 will open the charge switch S1 during the predefined low-voltage interval 56 to prevent the holding capacitor $C_{HOLD}$ from being discharged.

As previously mentioned, the master circuit 64 may communicate any data to the slave circuit 66 in the read data frame 52. In this regard, the slave circuit may include a register circuit 116 (denoted as "S-REGMAP") configured to explicitly indicate what type of data the master circuit 64 will communicate in the read data frame 52. Alternatively, if the register circuit 116 does not indicate the type of data the master circuit 64 will communicate in the read data frame 52, the slave circuit 66 may assume a worst case scenario wherein the master circuit 64 is sending a voltage PWM "0" in each of the read data symbols $T_S$ of the read data frame 52 and opportunistically charge the holding capacitor $C_{HOLD}$ as discussed above.

Figure 4B:
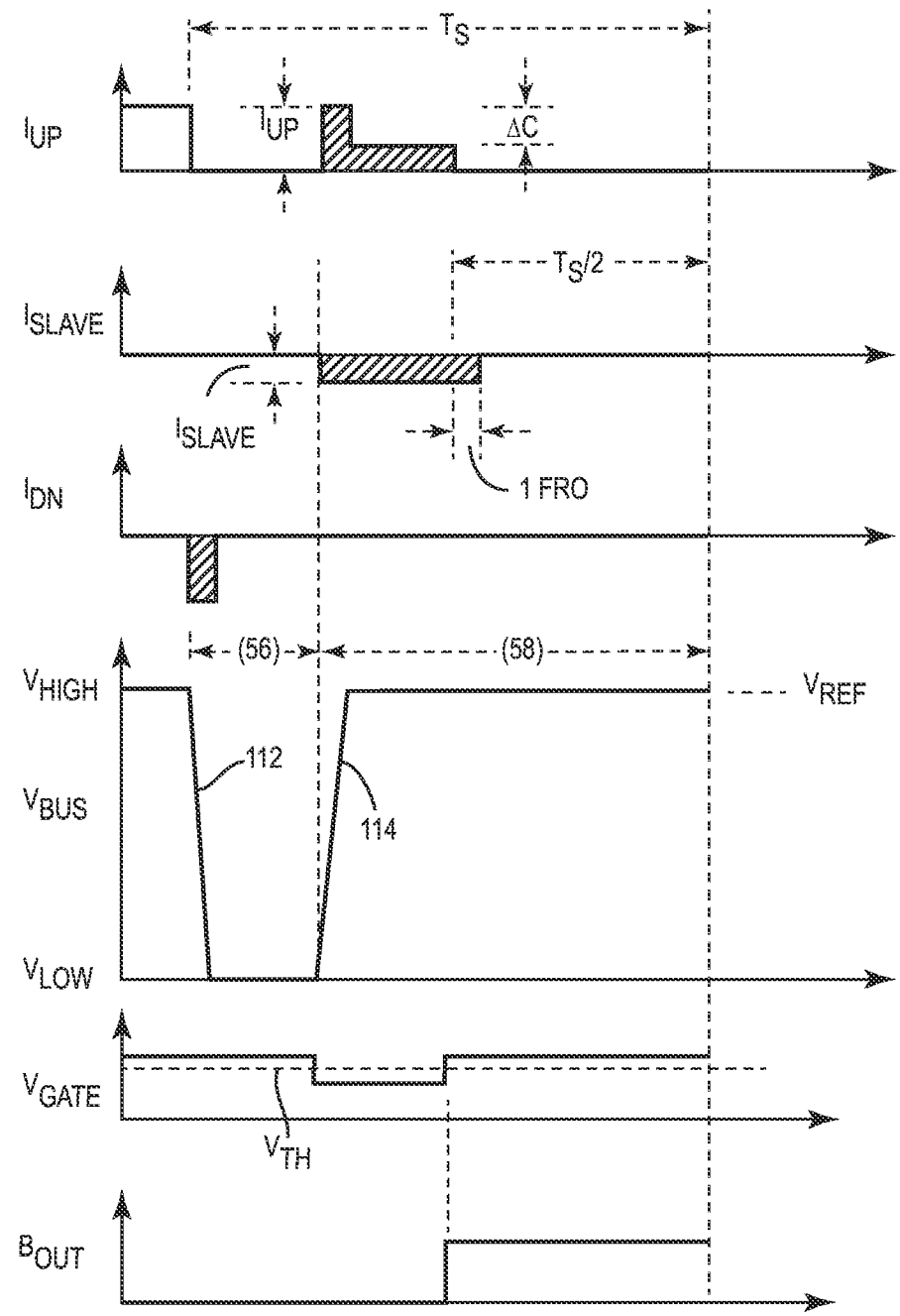
FIG. 4B is an exemplary illustration of how the master circuit of FIG. 3 can communicate an acknowledgement (ACK) on behalf of a slave circuit in the single-wire bus apparatus of FIG. 2.

The master circuit 64A of FIG. 3 can also be configured to acknowledge a write data frame 30, as shown in FIG. 1B, on behalf of the slave circuit 66. In this regard, FIG. 4B is an exemplary illustration of how the master circuit 64A of FIG. 3 can communicate an ACK on behalf of the slave circuit 66 in FIG. 2.

In this example, the bus driver circuit 70A communicates a voltage PWM "1" in an ACK symbol $T_S$, which can be any of the ACK symbols 44 in FIG. 1B, to indicate an ACK on behalf of the slave circuit 66. In this regard, as previously discussed in FIG. 1D, the bus driver circuit 70A first asserts the bus voltage $V_{BUS}$ at the lower bus voltage $V_{LOW}$ for the predefined low-voltage interval 56 and then raises the bus voltage $V_{BUS}$ to the higher bus voltage $V_{HIGH}$ for the predefined high-voltage interval 58.

To assert the bus voltage $V_{BUS}$ at the lower bus voltage $V_{LOW}$, the master controller 78 is configured to deactivate the transistor 90 and activate the master current sink 76 to induce the sink current $I_{DN}$ at the falling edge 112 of the voltage PWM value "1" in the ACK symbol $T_S$. In contrast, to raise the bus voltage $V_{BUS}$ to the higher bus voltage $V_{HIGH}$, the master controller 78 is configured to activate the transistor 90 and deactivate the master current sink 76. In a non-limiting example, the higher bus voltage $V_{HIGH}$ can be equal to the supply voltage $V_{IO}$ before the slave circuit 66 causes any current variation $\Delta C$ on the single-wire bus 62. Accordingly, the transistor 90 will provide the source current $I_{UP}$ at a rising edge 114 of the voltage PWM value "1" in the ACK $T_S$.

In this example, the slave circuit 66 is configured to confirm the ACK communicated by the master circuit 64A. In this regard, the slave controller 84 activates the slave current sink 82 in the first half of the ACK symbol $T_S$ to draw the slave current $I_{SLAVE}$ from the master circuit 64A to reduce the source current $I_{UP}$, thus causing the current variation $\Delta C$ ($\Delta C = I_{UP} - I_{SLAVE}$) on the single-wire bus 62. In an alternative embodiment, the slave controller 84 may even activate the slave current sink 82 before the ACK symbol $T_S$.

The slave controller 84 may deactivate the slave current sink 82 based on timing information as determined based on the SOS sequence 24 as shown in FIG. 1B. The slave controller 84 may deactivate the slave current sink 82 at a half point of the ACK symbol $T_S$ or after a delay (e.g., one FRO) from the half point of the ACK symbol $T_S$.

Notably, the current variation $\Delta C$ can cause the bus voltage $V_{BUS}$ to drop from the higher bus voltage $V_{HIGH}$. In this regard, the reference comparator 92 compares the bus voltage $V_{BUS}$ against the reference voltage $V_{REF}$. If the bus voltage $V_{BUS}$ falls below the reference voltage $V_{REF}$, the reference comparator 92 will reduce the gate voltage $V_{GATE}$ at the gate electrode G to help maintain the higher bus voltage $V_{HIGH}$ at the reference voltage $V_{REF}$. In this regard, if the gate voltage $V_{GATE}$ is reduced, it is an indication that the current variation $\Delta C$ is present on the single-wire bus 62. In contrast, if the gate voltage $V_{GATE}$ is not reduced, it is an indication that the current variation $\Delta C$ is absent on the single-wire bus 62. When the gate voltage $V_{GATE}$ falls below the threshold voltage $V_{TH}$, the receiver circuit 72 will output binary "1" at the binary output $B_{OUT}$ (e.g., in a second half of the ACK symbol $T_S$) to indicate that an ACK is received from the slave circuit 66.

Understandably, the slave controller 84 may keep the slave current sink 82 deactivated throughout the ACK symbol $T_S$ if the slave circuit 66 intends to send a NACK to the master circuit 64A. As such, the gate voltage $V_{GATE}$ will not drop below the threshold voltage $V_{TH}$. Accordingly, the receiver circuit 72 will output binary "0" at the binary output $B_{OUT}$ (e.g., in a second half of the ACK symbol $T_S$) to indicate that a NACK is received from the slave circuit 66.

Figure 5:
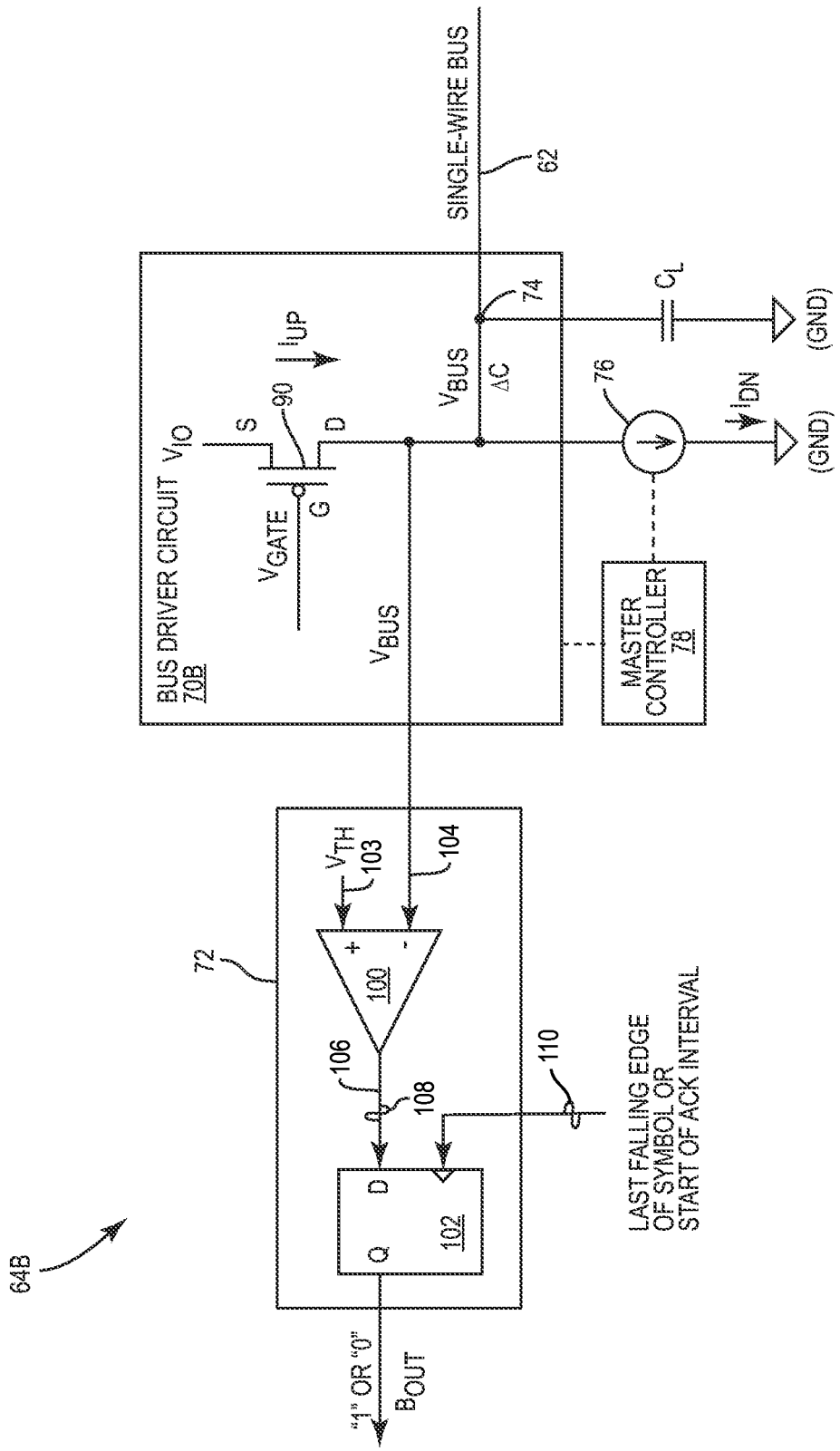
FIG. 5 is a schematic diagram of an exemplary master circuit configured according to an open loop configuration.

In another embodiment, the master circuit 64 can be configured based on an open loop configuration. In this regard, FIG. 5 is a schematic diagram of an exemplary master circuit 64B configured according an open loop configuration.

The master circuit 64B includes a bus driver circuit 70B. In a non-limiting example, the bus driver circuit 70B is a master current source that includes the transistor 90 having the source electrode S configured to receive the supply voltage $V_{IO}$ and the drain electrode D coupled to the master port 74 and the master current sink 76. The master controller 78 may be coupled to the gate electrode G to provide the gate voltage $V_{GATE}$.

In contrast to the master circuit 64A of FIG. 3, the fourth input 104 of the comparator 100 is coupled to the master port 74 to receive the bus voltage $V_{BUS}$. Specifically, the comparator 100 compares the bus voltage $V_{BUS}$ against the threshold voltage $V_{TH}$ and outputs the indication signal 108 that indicates whether the bus voltage $V_{BUS}$ is lower than the threshold voltage $V_{TH}$.

The D type flip flop 102 outputs the first binary value (e.g., "1") via the binary output $B_{OUT}$ when the indication signal 108 indicates that the bus voltage $V_{BUS}$ is lower than the threshold voltage $V_{TH}$ and outputs the second binary value (e.g., "0") via the binary output $B_{OUT}$ otherwise. In a non-limiting example, the D type flip flop 102 can be controlled by the control signal 110 to output the first binary value or the second binary value at the last falling edge of the read data symbols $T_S$ or at the start of the ACK symbols 44.

Figure 6A:
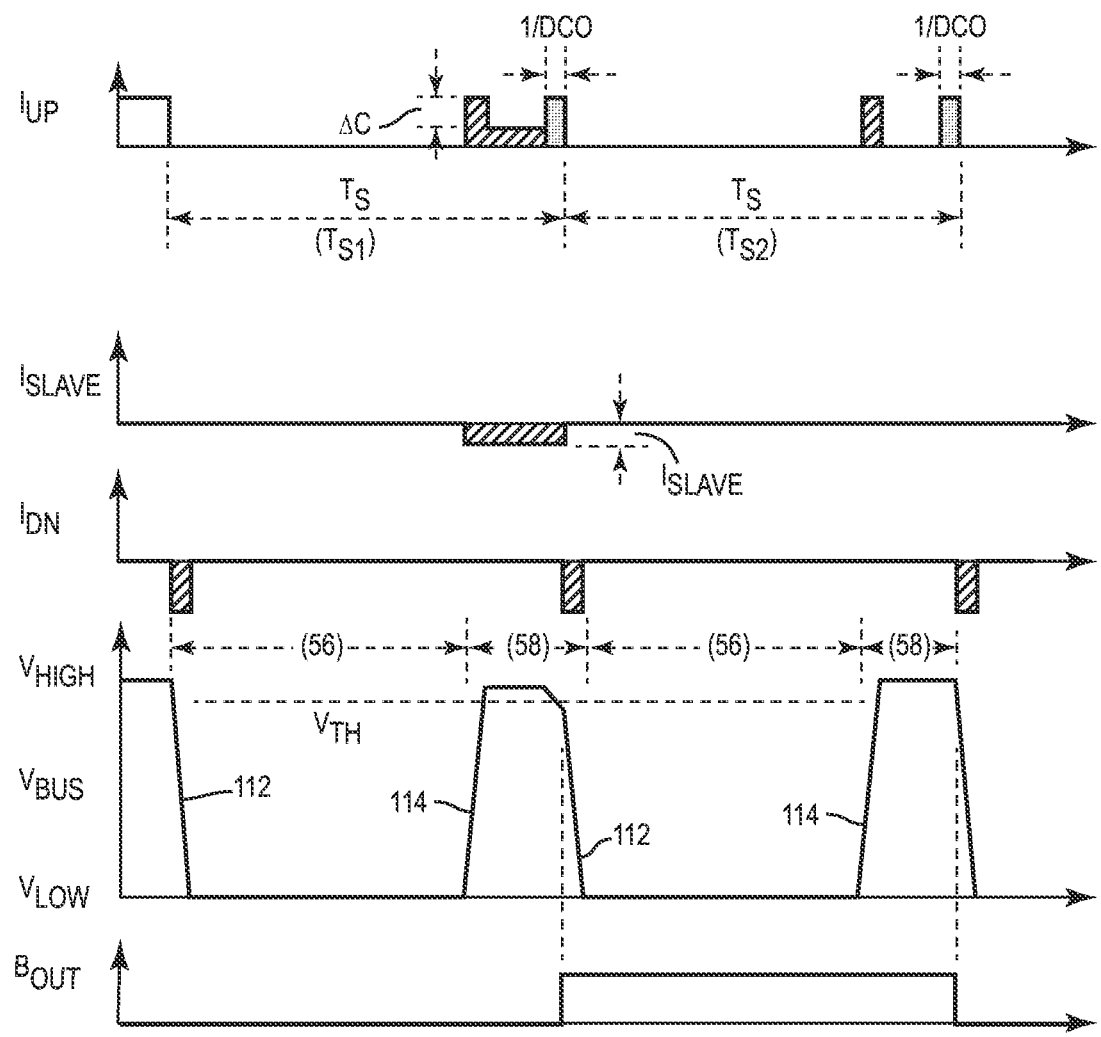
FIG. 6A is an exemplary illustration of how the master circuit of FIG. 5 and a slave circuit in the single-wire bus apparatus of FIG. 2 can be configured to support full-duplex communications on the single-wire bus during a read data frame in the bus telegrams of FIG. 1C.

FIG. 6A is an exemplary illustration on how the master circuit 64B of FIG. 5 and the slave circuit 66 in FIG. 2 can be configured to support full-duplex communications on the single-wire bus 62 during the read data frame 52 in FIG. 1C. In this example, the bus driver circuit 70B is configured to communicate a voltage PWM value "0" in each of the read data symbols $T_S$ during the read data frame 52. As such, based on previous discussions in FIG. 1E, the bus driver circuit 70A will modulate the voltage PWM value "0" in each of the read data symbols $T_S$ by first asserting the bus voltage $V_{BUS}$ at the lower bus voltage $V_{LOW}$ for the predefined low-voltage interval 56 and then raise the bus voltage $V_{BUS}$ to the higher bus voltage $V_{HIGH}$ for the predefined high-voltage interval 58.

To assert the bus voltage $V_{BUS}$ at the lower bus voltage $V_{LOW}$, the master controller 78 is configured to deactivate the transistor 90 and activate the master current sink 76 to induce a sink current $I_{DN}$ at the falling edge 112 of the voltage PWM value "0" in each of the read data symbols $T_S$. In contrast, to raise the bus voltage $V_{BUS}$ to the higher bus voltage $V_{HIGH}$, the master controller 78 is configured to activate the transistor 90 and deactivate the master current sink 76. In a non-limiting example, the higher bus voltage $V_{HIGH}$ can be equal to the supply voltage $V_{IO}$ before the slave circuit 66 causes any current variation $\Delta C$ on the single-wire bus 62. Accordingly, the transistor 90 will provide the source current $I_{UP}$ at the rising edge 114 of the voltage PWM value "0" in each of the read data symbols $T_S$.

In this example, the slave circuit 66 is configured to send a binary "1" in a first of the read data symbol $T_S$ (denoted as "$T_{S1}$") and a binary "0" in a second of the read data symbols $T_S$ (denoted as "$T_{S2}$"). In this regard, in the first read data symbol $T_{S1}$, the slave controller 84 deactivates the slave current sink 82 during the predefined low-voltage interval 56 and activates the slave current sink 82 during the predefined high-voltage interval 58. When activated, the slave current sink 82 draws the slave current $I_{SLAVE}$ from the master circuit 64B to reduce the source current $I_{UP}$, thus causing the current variation $\Delta C$ ($\Delta C = I_{UP} - I_{SLAVE}$) on the single-wire bus 62.

Notably, the current variation $\Delta C$ can cause the bus voltage $V_{BUS}$ to drop from the higher bus voltage $V_{HIGH}$. In this regard, if the bus voltage $V_{BUS}$ is reduced, it is an indication that the current variation $\Delta C$ is present on the single-wire bus 62. In contrast, if the bus voltage $V_{BUS}$ is not reduced, it is an indication that the current variation $\Delta C$ is absent on the single-wire bus 62. When the bus voltage $V_{BUS}$ falls below the threshold voltage $V_{TH}$, the receiver circuit 72 will output binary "1" at the binary output $B_{OUT}$.

In the second read data symbol $T_{S2}$, the slave controller 84 deactivates the slave current sink 82 during both the predefined low-voltage interval 56 and the predefined high-voltage interval 58. As a result, the slave circuit 66 will not draw the slave current $I_{SLAVE}$ from the master circuit 64B to reduce the source current $I_{UP}$, thus not causing the current variation $\Delta C$ on the single-wire bus 62. Accordingly, the higher bus voltage $V_{HIGH}$ and the gate voltage $V_{GATE}$ will not be reduced. As such, the bus voltage $V_{BUS}$ will not fall below the threshold voltage $V_{TH}$ and the receiver circuit 72 will output binary "0" at the binary output $B_{OUT}$.

In a non-limiting example, the master circuit 64B is configured to tristate the transistor 90 during a last DCO of the predefined high-voltage interval 58. As such, the slave current $I_{SLAVE}$ will cause the bus voltage $V_{BUS}$ to linearly decrease ($dV = I_{SLAVE}/C_L * 1/DCO$). Thus, at the falling edge 112 of a next of the read data symbols $T_S$, the receiver circuit 72 will output the binary "1" if the bus voltage $V_{BUS}$ is below the threshold $V_{TH}$.

The slave controller 84 can close the charge switch $S_1$ during the predefined high-voltage interval 58 to continue charging the holding capacitor $C_{HOLD}$. The slave controller 84 will open the charge switch S1 during the predefined low-voltage interval 56 and the last DCO of the predefined high-voltage interval 58 to prevent the holding capacitor $C_{HOLD}$ from being discharged.

Figure 6B:
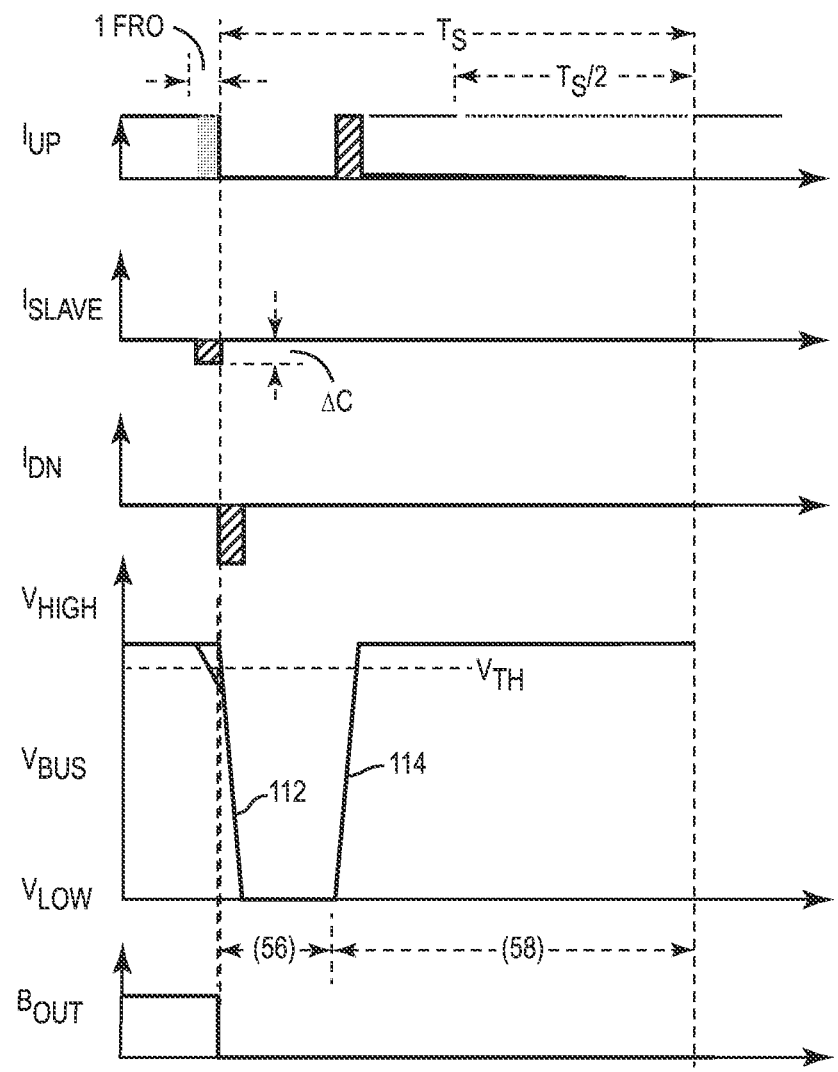
FIG. 6B is an exemplary illustration of how the master circuit of FIG. 5 can communicate an acknowledgement (ACK) on behalf of a slave circuit in the single-wire bus apparatus of FIG. 2.

The master circuit 64B of FIG. 5 can also be configured to acknowledge a write data frame 30, as shown in FIG. 1B, on behalf of the slave circuit 66. In this regard, FIG. 6B is an exemplary illustration on how the master circuit 64B of FIG. 5 can communicate an ACK on behalf of the slave circuit 66 in FIG. 2.

In this example, the bus driver circuit 70B communicates a voltage PWM "1" in an ACK symbol $T_S$, which can be any of the ACK symbols 44 in FIG. 1B, to indicate an ACK on behalf of the slave circuit 66. In this regard, as previously discussed in FIG. 1D, the bus driver circuit 70B first asserts the bus voltage $V_{BUS}$ at the lower bus voltage $V_{LOW}$ for the predefined low-voltage interval 56 and then rises the bus voltage $V_{BUS}$ to the higher bus voltage $V_{HIGH}$ for the predefined high-voltage interval 58.

To assert the bus voltage $V_{BUS}$ at the lower bus voltage $V_{LOW}$, the master controller 78 is configured to deactivate the transistor 90 and activate the master current sink 76 to induce the sink current $I_{DN}$ at the falling edge 112 of the voltage PWM value "1" in the ACK symbol $T_S$. In contrast, to raise the bus voltage $V_{BUS}$ to the higher bus voltage $V_{HIGH}$, the master controller 78 is configured to activate the transistor 90 and deactivate the master current sink 76. In a non-limiting example, the higher bus voltage $V_{HIGH}$ can be equal to the supply voltage $V_{IO}$ before the slave circuit 66 causes any current variation $\Delta C$ on the single-wire bus 62. Accordingly, the transistor 90 will provide the source current $I_{UP}$ at the rising edge 114 of the voltage PWM value "1" in the ACK $T_S$.

In this example, the slave circuit 66 is configured to confirm the ACK communicated by the master circuit 64A. In this regard, the slave controller 84 activates the slave current sink 82 before a start of the ACK symbol $T_S$ to draw the slave current $I_{SLAVE}$ from the master circuit 64B to reduce the source current $I_{UP}$. In a non-limiting example, the slave controller 84 activates the slave current sink 82 one FRO ahead of the falling edge 112. The slave controller 82 is also configured to deactivate the slave current sink 82 at the start (e.g., falling edge 112) of the ACK symbol $T_S$. In this regard, the slave current $I_{SLAVE}$ directly causes the current variation $\Delta C$ on the single-wire bus 62.

Notably, the current variation $\Delta C$ can cause the bus voltage $V_{BUS}$ to drop from the higher bus voltage $V_{HIGH}$. In this regard, if the bus voltage $V_{BUS}$ is reduced, it is an indication that the current variation $\Delta C$ is present on the single-wire bus 62. In contrast, if the bus voltage $V_{BUS}$ is not reduced, it is an indication that the current variation $\Delta C$ is absent on the single-wire bus 62. When the bus voltage $V_{BUS}$ falls below the threshold voltage $V_{TH}$, the receiver circuit 72 will output binary "1" at the binary output $B_{OUT}$ (e.g., before the start of the ACK symbol $T_S$) to indicate that an ACK is received from the slave circuit 66.

Understandably, the slave controller 84 may keep the slave current sink 82 deactivated if the slave circuit 66 intends to send a NACK to the master circuit 64A. As such, the bus voltage $V_{BUS}$ will not drop below the threshold voltage $V_{TH}$. Accordingly, the receiver circuit 72 will output binary "0" at the binary output $B_{OUT}$ (e.g., before the start of the ACK symbol $T_S$) to indicate that a NACK is received from the slave circuit 66.

Those skilled in the art will recognize improvements and modifications to the embodiments of the present disclosure. All such improvements and modifications are considered within the scope of the concepts disclosed herein and the claims that follow.

What is claimed is:

1. A single-wire bus apparatus comprising:
    a single-wire bus consisting of one wire;
    at least one slave circuit coupled to the single-wire bus and configured to:
        cause a current variation on the single-wire bus during any of one or more bus symbols in a bus telegram to thereby communicate a first binary value over the single-wire bus; and
        not cause the current variation on the single-wire bus during any of the one or more bus symbols in the bus telegram to thereby communicate a second binary value different from the first binary value over the single-wire bus; and
    a master circuit comprising:
        a bus driver circuit coupled to the single-wire bus and configured to:
            communicate, concurrently over the single-wire bus, one or more voltage pulse-width modulation (PWM) values in the one or more bus symbols in the bus telegram, respectively; and
            determine whether the current variation occurs on the single-wire bus in each of the one or more bus symbols; and
        a receiver circuit coupled to the bus driver circuit and configured to, for each of the one or more bus symbols:
            output the first binary value in response to detecting the current variation on the single-wire bus; and
            output the second binary value in response to not detecting the current variation on the single-wire bus.

2. The single-wire bus apparatus of claim 1 wherein the bus driver circuit is further configured to modulate each of the one or more voltage PWM values by asserting a bus voltage at a lower bus voltage for a predefined low-voltage interval and raising the bus voltage to a higher bus voltage for a predefined high-voltage interval.

3. The single-wire bus apparatus of claim 2 wherein:
    the bus driver circuit is further configured to:
        communicate the one or more voltage PWM values in one or more read data symbols comprised in a read data frame; and
        determine whether the current variation occurs in each of the one or more read data symbols; and
    the receiver circuit is further configured to, for each of the one or more read data symbols:
        output a binary one if the current variation occurs; and
        output a binary zero if the current variation does not occur.

4. The single-wire bus apparatus of claim 3 wherein the first binary value and the second binary value outputted by the receiver circuit are unrelated to the one or more voltage PWM values communicated by the bus driver circuit.

5. The single-wire bus apparatus of claim 3 wherein each of the one or more voltage PWM values is equal to zero.

6. The single-wire bus apparatus of claim 3 wherein each of the one or more voltage PWM values is equal to one.

7. The single-wire bus apparatus of claim 3 wherein each of the one or more voltage PWM values is equal to the binary one or the binary zero last outputted by the receiver circuit.

8. The single-wire bus apparatus of claim 3 wherein each of the one or more voltage PWM values is equal to one or zero.

9. The single-wire bus apparatus of claim 3 wherein the at least one slave circuit comprises:
    a slave port coupled to the single-wire bus;
    a slave current sink coupled between the slave port and a ground;

a holding capacitor having a first end coupled to the slave port via a charge switch and a second end coupled to the ground; and a slave controller coupled to the slave current sink and the charge switch.

10. The single-wire bus apparatus of claim 9 wherein the slave controller is configured to, for each of the one or more read data symbols:

determine whether to send the binary one or the binary zero;

deactivate the slave current sink during the predefined low-voltage interval and activate the slave current sink during the predefined high-voltage interval such that the at least one slave circuit draws a source current from the master circuit and thereby causes the current variation when the slave controller determines to send the binary one;

deactivate the slave current sink during the predefined low-voltage interval and the predefined high-voltage interval such that the at least one slave circuit does not draw the source current from the master circuit and thereby does not cause the current variation when the slave controller determines to send the binary zero;

close the charge switch during the predefined high-voltage interval such to charge the holding capacitor; and open the charge switch during the predefined low-voltage interval.

11. The single-wire bus apparatus of claim 9 wherein:
the bus driver circuit is further configured to:
communicate any of the one or more voltage PWM values in a respective one of one or more acknowledgement (ACK) symbols succeeding a write data frame; and
determine whether the current variation occurs in the respective one of the one or more ACK symbols; and
the receiver circuit is further configured to:
output an indication indicating an ACK if the current variation occurs; and
output the indication indicating a No-ACK (NACK) if the current variation does not occur.

12. The single-wire bus apparatus of claim 11 wherein the any of the one or more voltage PWM values is modulated to indicate the ACK.

13. The single-wire bus apparatus of claim 11 wherein the slave controller is further configured to:
determine whether to send the ACK or the NACK during the any of the one or more ACK symbols;
activate the slave current sink in a first half of the any of the one or more ACK symbols and deactivate the slave current sink in a second half of the any of the one or more ACK symbols such that the at least one slave circuit draws a source current from the master circuit and thereby causes the current variation when the slave controller determines to send the ACK; and
deactivate the slave current sink such that the at least one slave circuit does not draw the source current from the master circuit and thereby does not cause the current variation when the slave controller determines to send the NACK.

14. The single-wire bus apparatus of claim 11 wherein the slave controller is further configured to:
determine whether to send the ACK or the NACK during the any of the one or more ACK symbols;
activate the slave current sink before a start of the any of the one or more ACK symbols and deactivate the slave current sink at the start of the any of the one or more ACK symbols such that the at least one slave circuit draws a source current from the master circuit and thereby causes the current variation when the slave controller determines to send the ACK; and
deactivate the slave current sink such that the at least one slave circuit does not draw the source current from the master circuit and thereby does not cause the current variation when the slave controller determines to send the NACK.

15. The single-wire bus apparatus of claim 2 wherein the master circuit further comprises:
a master port coupled to the single-wire bus;
a master current sink coupled between the master port and a ground; and
a master controller configured to cause the master circuit to modulate the one or more voltage PWM values in the one or more bus symbols, respectively.

16. The single-wire bus apparatus of claim 15 wherein:
the bus driver circuit comprises a master current source coupled to the master current sink and the master port; and
the master controller is further configured to, in each of the one or more bus symbols:
deactivate the master current source and activate the master current sink during the predefined low-voltage interval to assert the bus voltage at the lower bus voltage; and
activate the master current source and deactivate the master current sink during the predefined high-voltage interval to assert the bus voltage at the higher bus voltage.

17. The single-wire bus apparatus of claim 16 wherein the receiver circuit comprises:
a comparator coupled to the master port and configured to:
compare the bus voltage against a threshold voltage during the predefined high-voltage interval; and
output an indication signal that indicates whether the bus voltage is lower than the threshold voltage; and
a D type flip flop coupled to the comparator and configured to:
output the first binary value when the indication signal indicates that the bus voltage is lower than the threshold voltage; and
output the second binary value when the indication signal indicates that the bus voltage is not lower than the threshold voltage.

18. The single-wire bus apparatus of claim 15 wherein:
the bus driver circuit comprises a low dropout (LDO) master current source coupled to the master current sink and the master port; and
the master controller is further configured to:
deactivate the LDO master current source and activate the master current sink during the predefined low-voltage interval to assert the bus voltage at the lower bus voltage; and
activate the LDO master current source and deactivate the master current sink during the predefined high-voltage interval to maintain the bus voltage at a reference voltage substantially close to the higher bus voltage.

19. The single-wire bus apparatus of claim 18 wherein the LDO master current source comprises:
a transistor having a gate electrode configured to receive a gate voltage, a source electrode configured to receive a supply voltage, and a drain electrode coupled to the master port and configured to assert the bus voltage on the single-wire bus; and a reference comparator having a first input configured to receive the reference voltage, a second input coupled to the drain electrode to receive the bus voltage, and an output coupled to the gate electrode and configured to output the gate voltage;

wherein the reference comparator is configured to reduce the gate voltage when the bus voltage is lower than the reference voltage to thereby maintain the bus voltage at the reference voltage.

20. The single-wire bus apparatus of claim 19 wherein the receiver circuit comprises:

a comparator coupled to the output of the reference comparator and configured to:

compare the gate voltage against a threshold voltage; and output an indication signal that indicates whether the gate voltage is lower than the threshold voltage; and a D type flip flop coupled to the comparator and configured to:

output the first binary value when the indication signal indicates that the gate voltage is lower than the threshold voltage; and output the second binary value when the indication signal indicates that the gate voltage is not lower than the threshold voltage.

\* \* \* \* \*